US010529245B2

(12) United States Patent
Gawlick et al.

(10) Patent No.: US 10,529,245 B2
(45) Date of Patent: Jan. 7, 2020

(54) METHODS FOR IMPROVING TEST EFFICIENCY AND ACCURACY IN A COMPUTER ADAPTIVE TEST (CAT)

(71) Applicant: ACT, INC., Iowa City, IA (US)

(72) Inventors: Lisa Gawlick, Iowa City, IA (US); Changhui Zhang, Coralville, IA (US); Nancy Petersen, Solon, IA (US); Lingyun Gao, Coralville, IA (US); Wugen Dai, Iowa City, IA (US)

(73) Assignee: ACT, INC., Iowa City, IA (US)

( * ) Notice: Subject to any disclaimer, the term of this patent is extended or adjusted under 35 U.S.C. 154(b) by 1194 days.

(21) Appl. No.: 14/562,187

(22) Filed: Dec. 5, 2014

(65) Prior Publication Data

US 2015/0161901 A1 Jun. 11, 2015

Related U.S. Application Data

(60) Provisional application No. 61/912,774, filed on Dec. 6, 2013.

(51) Int. Cl.
*G09B 7/00* (2006.01)

(52) U.S. Cl.
CPC ........................ *G09B 7/00* (2013.01)

(58) Field of Classification Search
CPC ............................................. G09B 7/02
USPC .................................................. 434/362
See application file for complete search history.

(56) References Cited

U.S. PATENT DOCUMENTS

| 5,059,127 A | 10/1991 | Lewis et al. |
| 5,565,316 A | 10/1996 | Kershaw et al. |
| 5,657,256 A | 8/1997 | Swanson et al. |
| 5,827,070 A | 10/1998 | Kershaw et al. |
| 5,841,655 A | 11/1998 | Stocking et al. |
| 6,000,945 A | 12/1999 | Sanchez-Lazer et al. |
| 6,118,973 A | 9/2000 | Ho et al. |
| 6,120,299 A | 9/2000 | Trenholm et al. |
| 6,418,298 B1 | 7/2002 | Sonnenfeld |
| 6,431,875 B1 | 8/2002 | Elliott et al. |
| 6,606,479 B2 | 8/2003 | Cook et al. |
| 6,652,283 B1 | 11/2003 | Van Schaack et al. |
| 6,688,889 B2 | 2/2004 | Wallace et al. |
| 6,704,741 B1 | 3/2004 | Lively, Jr. et al. |

(Continued)

OTHER PUBLICATIONS

Han, Kyung T., "Item Pocket Method to Allow Response Review and Change in Computerized Adaptive Testing", Applied Psychological Measurement, (Jun. 2013), vol. 37, No. 4, pp. 259-275.

(Continued)

*Primary Examiner* — Thomas J Hong

(74) *Attorney, Agent, or Firm* — Sheppard, Mullin, Richter & Hampton LLP

(57) ABSTRACT

A method for test item selection is provided that includes a computer implemented test battery having at least two or more sections with a plurality of test items. An ability estimate is calculated from an earlier section(s) of the at least two or more sections and an initial item and subsequent items for a subsequent section are selected from the plurality of test items based upon the ability estimate(s) from the earlier section(s). Use of a more informative initial ability estimate in the item selection process can improve interim ability estimation accuracy and item selection efficiency while keeping item exposure and item usage rates at acceptable levels.

20 Claims, 8 Drawing Sheets

(56) References Cited

U.S. PATENT DOCUMENTS

| | | | |
|---|---|---|---|
| 8,131,554 B2 | 3/2012 | Higgins | |
| 8,229,343 B2 | 7/2012 | Driscoll et al. | |
| 2002/0160347 A1 | 10/2002 | Wallace et al. | |
| 2002/0192629 A1 | 12/2002 | Shafrir | |
| 2003/0138765 A1 | 7/2003 | Bowers | |
| 2004/0091847 A1* | 5/2004 | Creamer | G09B 7/02 434/353 |
| 2004/0202988 A1 | 10/2004 | Evans et al. | |
| 2005/0125196 A1 | 6/2005 | Swanson | |
| 2005/0186551 A1 | 8/2005 | Belov | |
| 2005/0256663 A1 | 11/2005 | Fujimori | |
| 2006/0228686 A1* | 10/2006 | McKinley | G09B 7/00 434/323 |

OTHER PUBLICATIONS

Stocking, M.L., "Revising Item Responses in Computerized Adaptive Tests: A Comparison of Three Models", Applied Psychological Measurement, (Jun. 1997), vol. 21, No. 2 pp. 129-142.

Wise, S.L., "A Critical Analysis of the Arguments for and Against Item Review in Computerized Adaptive Testing" Paper Presented at the Annual Meeting of the National Council on Measurement in Education, New York, (Apr. 1996), pp. 1-25.

Papanastasiou, Elena C. & Mark D. Reckase, "A Rearrangement Procedure for Scoring Adaptive Tests with Review Options", International Journal of Testing, (2007) vol. 7, No. 4, pp. 387-407.

Wainer, H., "Some Practical Considerations When Converting a Linearly Administered Test to an Adaptive Format", Educational Measurement; Issues and Practices, (1993) vol. 12, pp. 15-20 Apr. 1, 1993.

Robin, Frederic, "A Comparison of Conventional and Bin-Structured Computerized Adaptive Tests", Paper Presented at the annual meeting of the American Educational Research Association, Montreal, Canada, (Apr. 13, 2005).

Davey, Tim, "An introduction to Bin-Structured Adaptive Testing", Paper Presented at the Annual Meeting of the National Council on Measurement in Education, Montreal, (Apr. 2005).

Jodoin, Michael G., "Developing Bin-Structured Item Pools", Paper Presented at the Annual Meeting of the American Educational Research Association, Montreal, QC, (Apr. 15, 2005).

* cited by examiner

Section 1 All Conditions

Section 2 All Conditions

Section 2 Sample1

Section 2 Sample 2

Section 2 Sample 3

Section 2 Sample 4

Section 2 Sample 1

Section 2 Sample 2

METHODS FOR IMPROVING TEST EFFICIENCY AND ACCURACY IN A COMPUTER ADAPTIVE TEST (CAT)

CROSS-REFERENCE TO RELATED APPLICATIONS

This application claims priority under 35 U.S.C. § 119 to provisional application Ser. No. 61/912,774, filed Dec. 6, 2013, which is hereby incorporated in its entirety.

BACKGROUND

I. Field of the Disclosure

The present disclosure relates to computer adaptive testing. More specifically, but not exclusively, the present disclosure relate to methods for improving ability estimation accuracy and item selection efficiency in a Computer Adaptive Test (CAT).

II. Description of the Prior Art

In educational assessments, a test battery is usually composed of several related sections based on content categories. The inter-relationships among different sections can be used to improve the test efficiency in a Computer Adaptive Test (CAT) scenario.

Therefore, a primary object, feature, or advantage of the present disclosure uses an examinee's ability estimate from an earlier section to inform the selection of the initial item and the subsequent items in a later section.

To date, a number of studies have been conducted on selecting the initial item based on an examinee's scores from earlier related tests using a variety of methods. However, none of the methods used in these studies have provided satisfactory results. Furthermore, using prior ability estimates to drive the starting point for a subsequent test section has not been widely used and practiced.

Therefore, it is another object, feature, or advantage of the present disclosure to provide a method for using the ability estimates from a previous test or test section(s) as prior information to inform the selection of the initial item of a subsequent test or section of a test.

Another object, feature, or advantage of the present disclosure is to improve methods for item selection and ability estimation in a CAT for accurately measuring an examinee's ability.

A still further object, feature, or advantage of the present disclosure is to provide methods for initial item selection based on ability estimates from a previous section.

One or more of these and/or other objects, features or advantages of the present disclosure will become apparent from the specification and claims that follow.

SUMMARY

The present disclosure improves test efficiency and accuracy in a Computer Adaptive Test (CAT).

One exemplary method is for test item selection. One example of such includes a computer and a computer implemented test battery having a plurality of test sections. Each test section has a set of test items selected from a plurality of test items. An item selection process is also provided. At least one section from the plurality of test sections is administered to an examinee using the computer. The computer is configured to receive the examinee's responses to the set of test items in the one section. The item selection process for at least one subsequent test section is informed based on scores from the one test section or previous test sections.

According to another aspect, a method for test item selection is provided. A computer and computer implemented test battery are included along with at least two or more test sections having a plurality of test items. One test section of the at least two or more test sections is administered to an examinee using the computer. The computer is adapted to receive the examinee's responses to a set of the plurality of test items for the one test section. An initial ability estimate for the examinee's responses to the set of the plurality of test items in the one test section is calculated. One or more test items from the plurality of test items are selected to include in a subsequent test section to the one test section of the at least two or more test sections based upon the initial ability estimate from at least the one previous test section.

According to still another aspect, a method for test item selection is provided. The item selection method includes a computer and a computer implemented test battery having at least two or more test sections with a plurality of test items. One section of the at least two or more test sections are administered to an examinee using the computer. The computer receives the examinee's responses to a set of the plurality of test items for the one test section. An initial ability estimate is calculated for the examinee's responses to the set of the plurality of test items in the one test section. The plurality of test items are minimized to a subset of test items based upon the initial ability estimate from at least the one previous test section. A next test item is selected from the subset of test items for the subsequent test section.

BRIEF DESCRIPTION OF THE DRAWINGS

Illustrated embodiments of the present disclosure are described in detail below with reference to the attached drawing figures, which are incorporated by reference herein, and where.

DETAILED DESCRIPTION OF THE PREFERRED EMBODIMENTS

Figure 1:
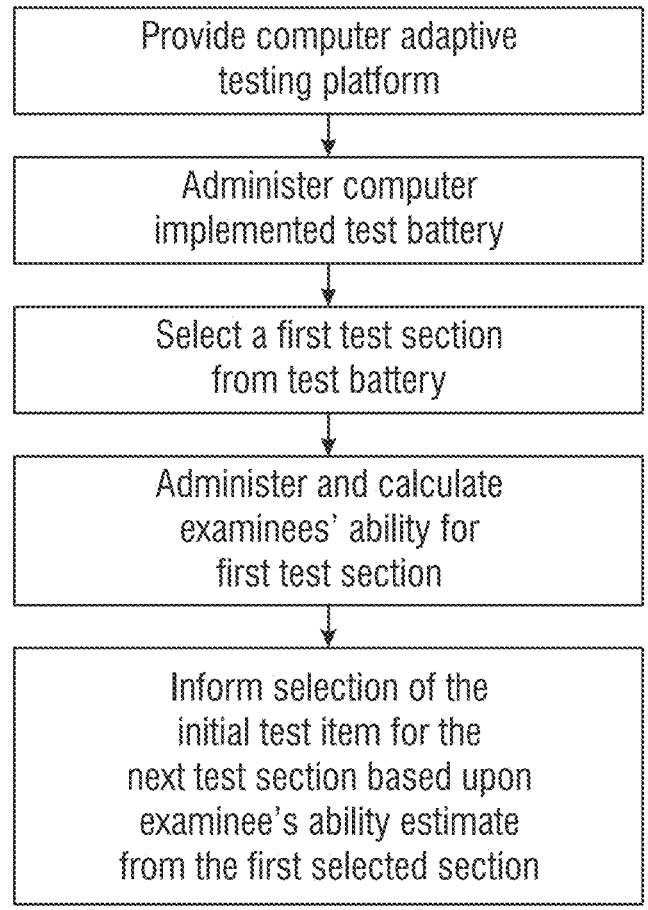
FIG. 1 is a flowchart of a process for item selection in computer adaptive testing in accordance with an illustrative embodiment.

The present disclosure provides for various computer adaptive testing methods. One exemplary method includes a method for item selection and ability estimation in a computer adaptive test. The accuracy and efficiency of a computer adaptive test is improved by making the test more succinct and/or accurate, and thus more effective. What results is a testing platform using a computer adaptive test that can estimate an examinee's ability using the examinee's response information relating to a specific set of operational test items.

In educational assessments, a test battery is usually composed of several related sections based on content categories. The inter-relationships among different sections can be used to improve the test efficiency in a computer adaptive testing (CAT) scenario. For example, an examinee's ability estimate from an earlier section can inform the selection of an initial item and the subsequent items in a later section. The methods used for item selection and ability estimation in CAT are essential for accurately measuring an examinee's ability.

The current invention is aimed to solve the problem of less accurate estimation in the early stage of adaptive testing, which affects the accuracy of interim ability estimation and results in a less efficient item selection process for adaptive test batteries involving related subtests or test sections.

The item selection algorithm for a CAT usually starts with selecting an initial ability estimate for the examinee. The first item can then be selected at random from a subset of items (where the subset may be specified to contain from one to n items). There are various methods for selecting the item to present (e.g., one whose difficulty is closest to the ability estimate, one with the most information at the ability estimate). The examinee responds to the selected item. The examinee's response to the first item is scored and used to update the ability estimate for the examinee. There are various estimation methods that may be used by the item selection algorithm for interim ability estimation (e.g., maximum-likelihood, expected a posteriori). The process of item selection and interim ability estimation continues until the stopping rule for the CAT is satisfied.

A search of the literature finds that research studies on the theory and practice of item selection for adaptive test batteries is sparse. While a number of item selection procedures in a CAT have been proposed or employed, many of them have limitations and are not necessarily suitable for test batteries. For example, a commonly used item selection procedure in CAT involves the use of the maximum likelihood (ML) ability estimator and the selection of the single best item by maximum-information criterion. A limitation with the ML estimator is the lack of finite estimates when responses to items are all correct or incorrect, which is highly likely early on in a CAT. Additionally, selecting the single best item by some criterion can lead to overexposure and overuse of some items, posing concerns on test security and item usage.

Expected a posteriori (EAP), a variation of empirical Bayesian estimation, can be used as a remedy to the ML limitations. However, a limitation with EAP is that the EAP estimates shrink toward the mean of the prior distribution. The bias incurred by shrinkage could reduce or even reverse the apparent relative superiority of the EAP estimates. Additionally, like the other Bayesian estimators, any inappropriate prior can affect estimation accuracy. Choice of a prior is a common feature of Bayesian methods, which determines the selection of the first item in the absence of response data. When the prior distribution does not adequately represent the true ability distribution, the initial ability estimates will likely be inappropriately biased and the estimation process will be inefficient. As the prior affects the posterior distribution, the accuracy of interim ability estimates will be affected at the selection phase. Previous studies have found that a normal prior distribution may not be an optimal choice when there is a well-supported rational for using a more appropriate prior distribution, such as the ability distribution obtained from a previous test or extensive knowledge of the underlying distribution. For example, bias can be eliminated when using empirically-based theta distributions as a prior of the EAP estimator. However, how to specify a suitable prior when Bayesian methods are used for ability estimation in the subsequent section(s) of a test battery involving related test sections has not been well researched. Thus, information used in the prior and how that information is used are important for Bayesian estimation accuracy and CAT efficiency, especially for test batteries involving related sections, where the knowledge of examinee ability distribution on the earlier section(s) could minimize the risk of choosing an inappropriate prior distribution.

Practically, the existing CAT programs involving multiple test sections usually use a fixed initial ability value for all examinees, without considering the interrelatedness between the test sections. The first several items in the test are usually randomly chosen from a large subset of the items satisfying the test blueprint for the first item. One limitation with this practice is that the arbitrarily chosen initial ability value, which can be quite different from the examinees' true ability, results in a less accurate start and an inefficient CAT process. Moreover, as mentioned earlier, using the same start for all examinees can lead to overexposure and over usage of the same items in the pool, posing an item security concern for the testing program.

To date, no research or practice using examinee performance on earlier test section(s) in a test battery to inform item selection for later sections has been identified. One of the features unique to test batteries is that a number of abilities measured by a test battery are typically strongly correlated, such as reasoning and critical reading abilities. Thus, information about the examinee's ability measured by one section could be available in other sections. It would be a waste if such useful information unique to test batteries is ignored when selecting the items for a later test section.

In the present disclosure, item selection in the subsequent test section(s) is adapted to the previous section(s) scores. Specifically, for each individual examinee, the initial theta on the subsequent section is predicted by his/her ability on an earlier related test section(s). When EAP estimator is used, the prior can also be based on the ability estimates obtained from the earlier section(s). Further, given that the initial and interim thetas are closer to true abilities after incorporating information from previous related sections, tightened selection factors (i.e., a much smaller subset of items is identified from which to select the next item based on some minimization statistic) are used throughout the administration process to target item selection at each step to the more accurate ability estimates.

Compared to the traditional item selection procedure for adaptive test batteries, the procedure proposed in the present disclosure has several advantages. First, the initial theta based on examinee performance on earlier related test section(s) provides an individualized and more accurate start, which can improve ability estimation accuracy and item selection efficiency for the subsequent items. Second, empirical initialization of the test also means a variable entry point to the pool, and as a result, more even exposure and usage of the pool items can be achieved. This is advantageous over the traditional practice, where a fixed initial theta value is assigned to all examinees and the first several items can become quickly overexposed due to always being chosen from the same subset in the pool. Third, given the more accurate interim ability estimates throughout the test process, a tightened selection factor at each step can further improve selection efficiency and ensure a closer match between selected items and examinee ability.

Therefore, what follows is continued written description and accompanying figures providing illustrative renderings disclosing use of a more informative initial ability estimate in an item selection process for improving interim ability estimation accuracy and item selection efficiency while keeping item exposure and item usage rates at acceptable levels.

I. Item Selection for Subsequent CAT Sections

Figure 2:
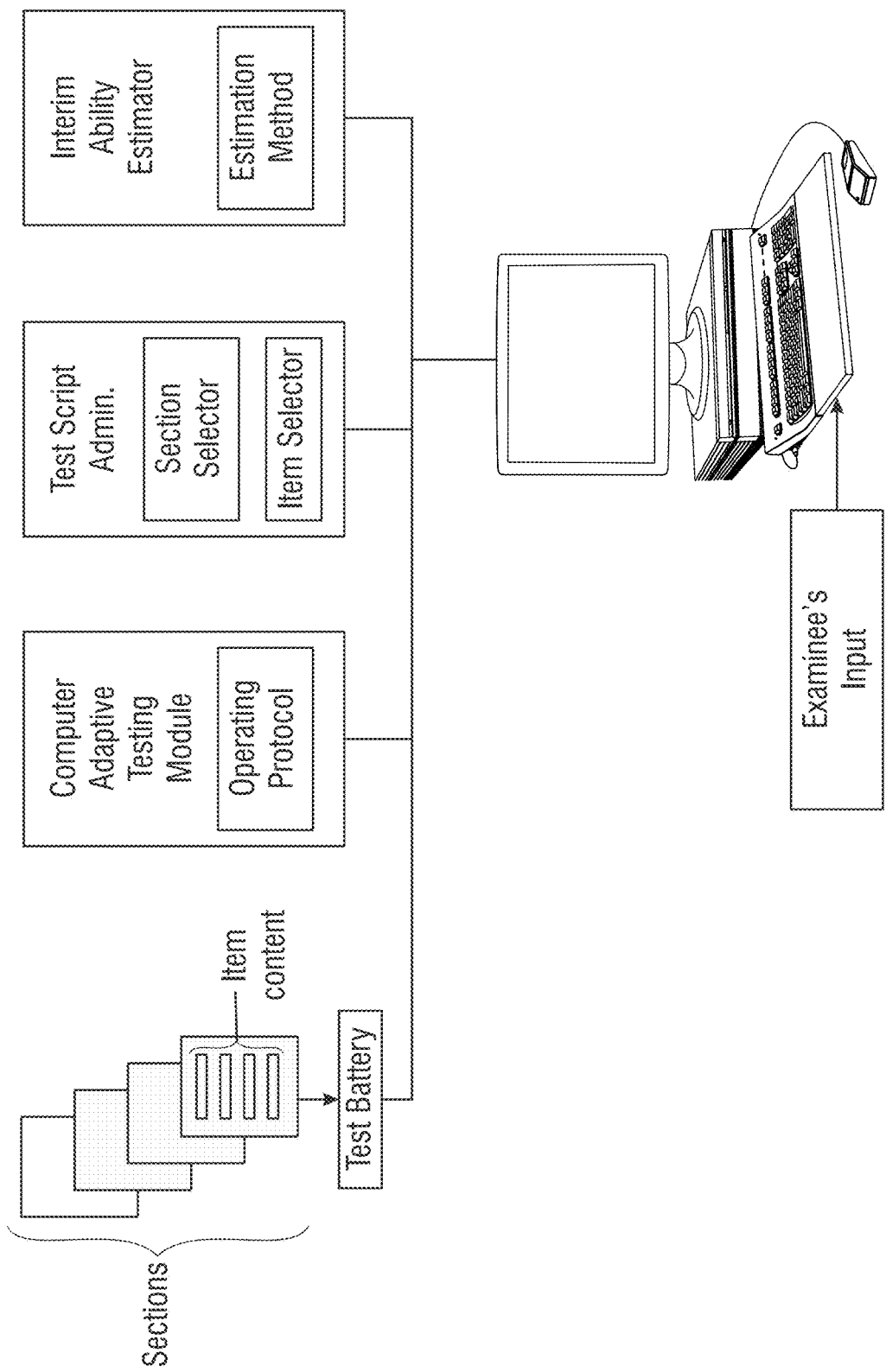
FIG. 2 is a block diagram providing an overview of an item selection process for computer adaptive testing in accordance with an illustrative embodiment.
Figure 3A:
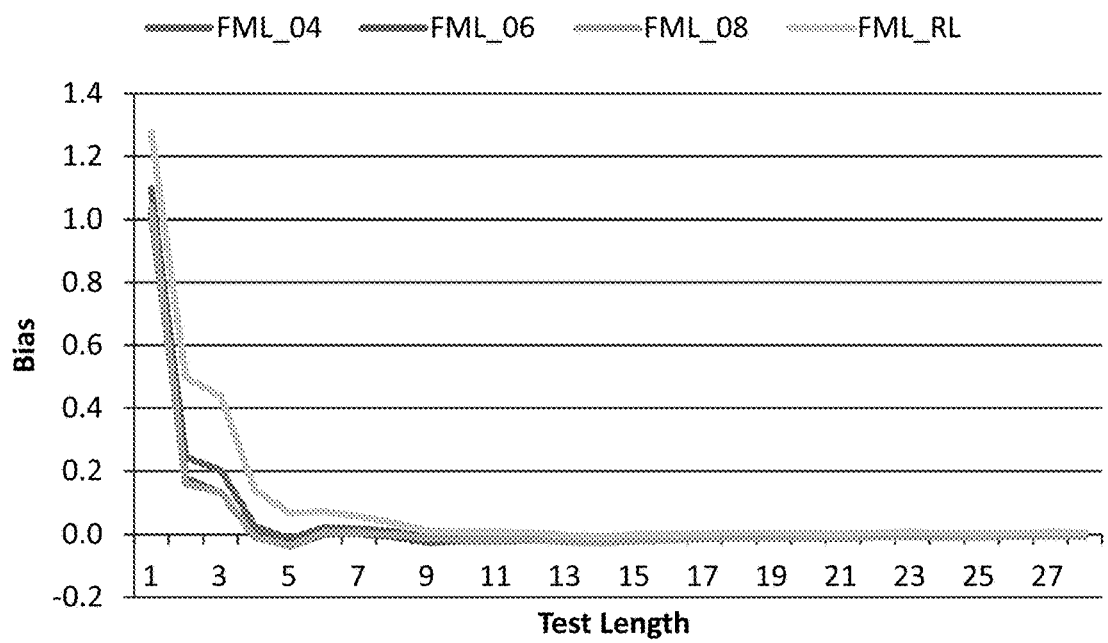
FIGS. 3(A-F) are pictorial representations in plot form for the bias of the interim theta estimates for both Sections 1 and 2 in accordance with an illustrative embodiment.
Figure 3B:
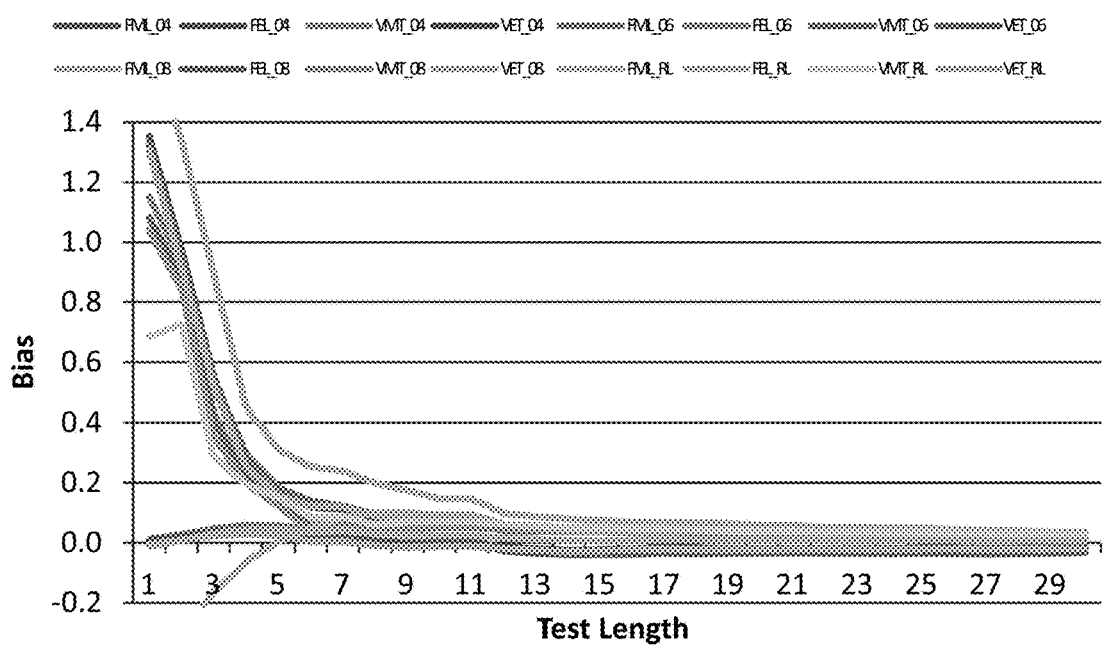
Figure 3C:
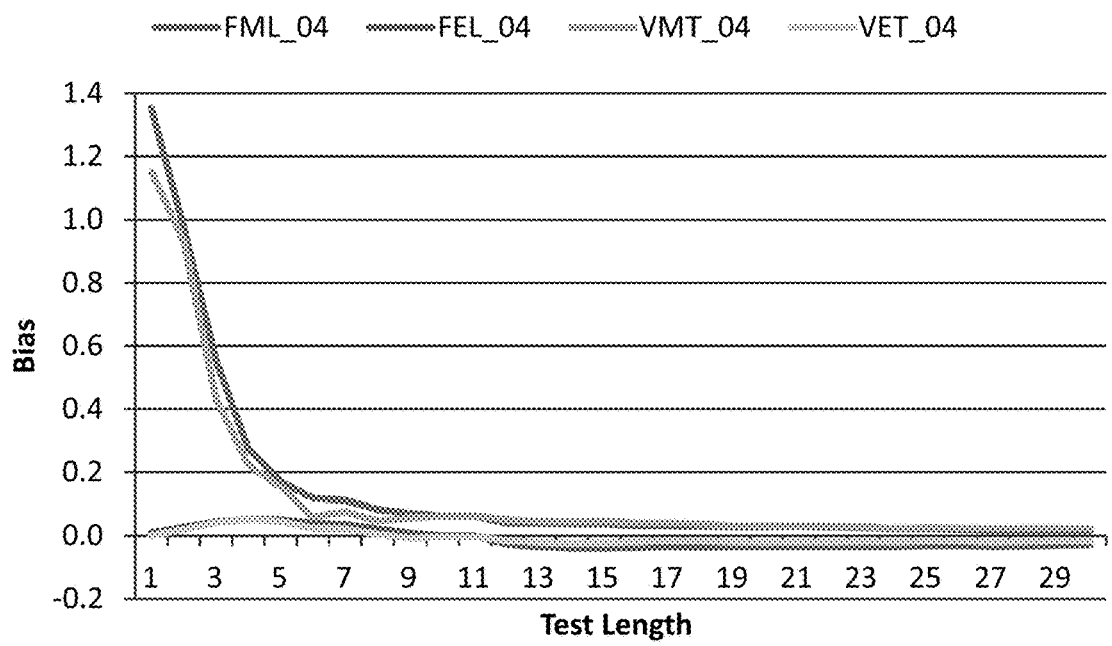
Figure 3D:
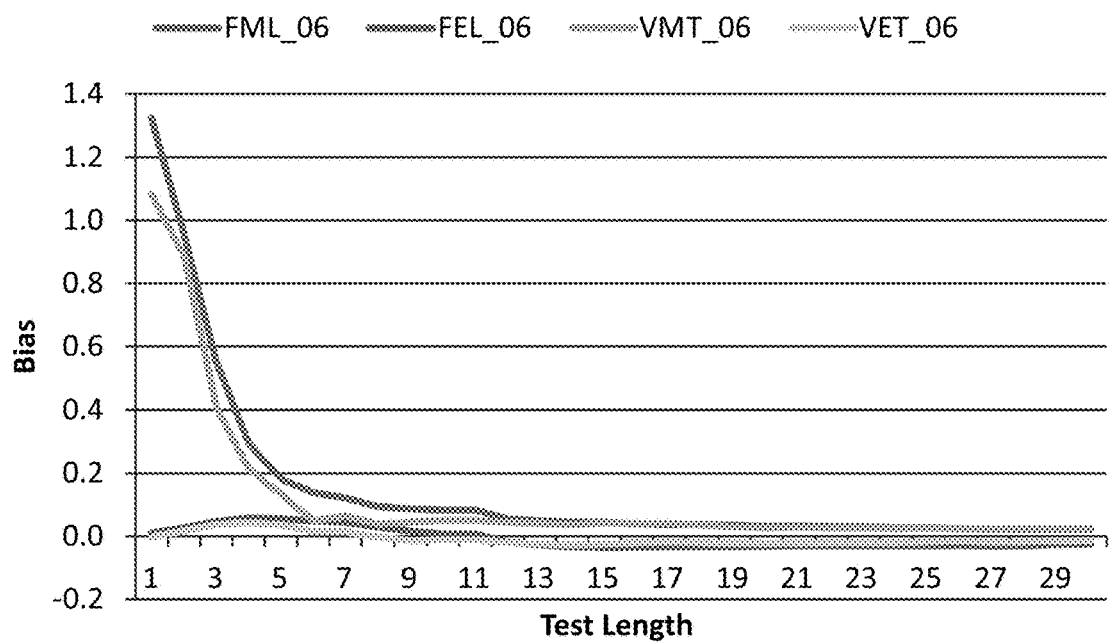
Figure 3E:
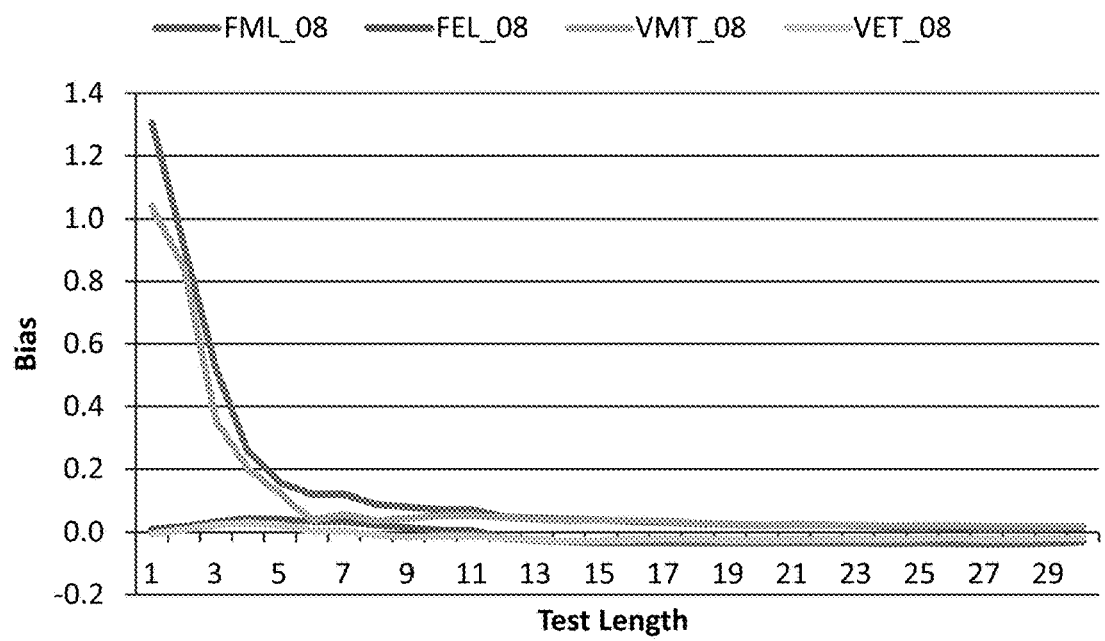
Figure 3F:
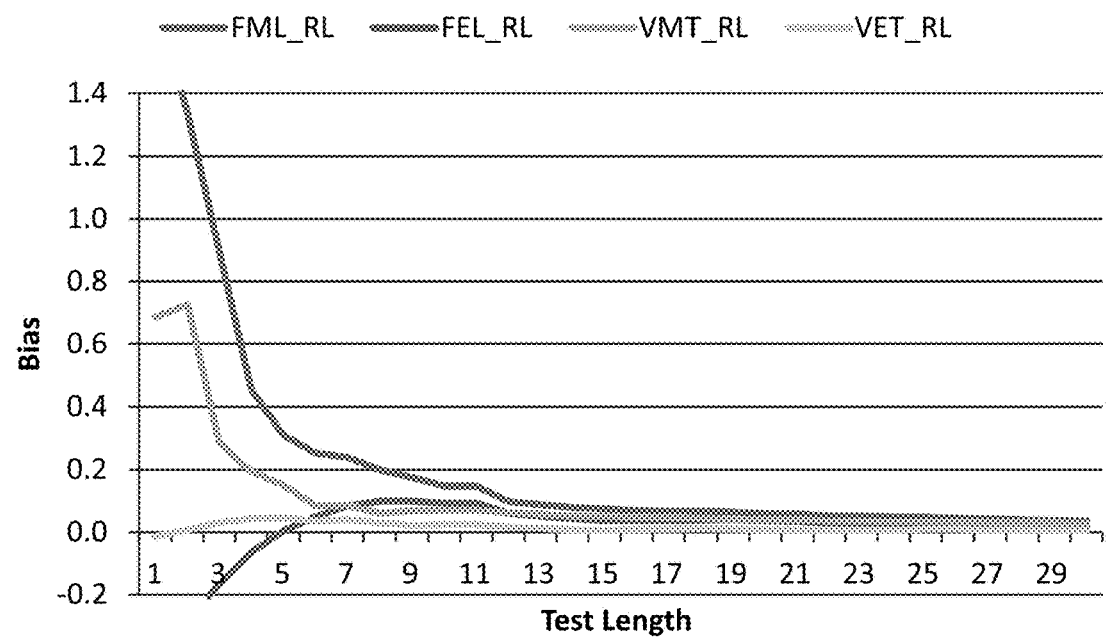
Figure 4A:
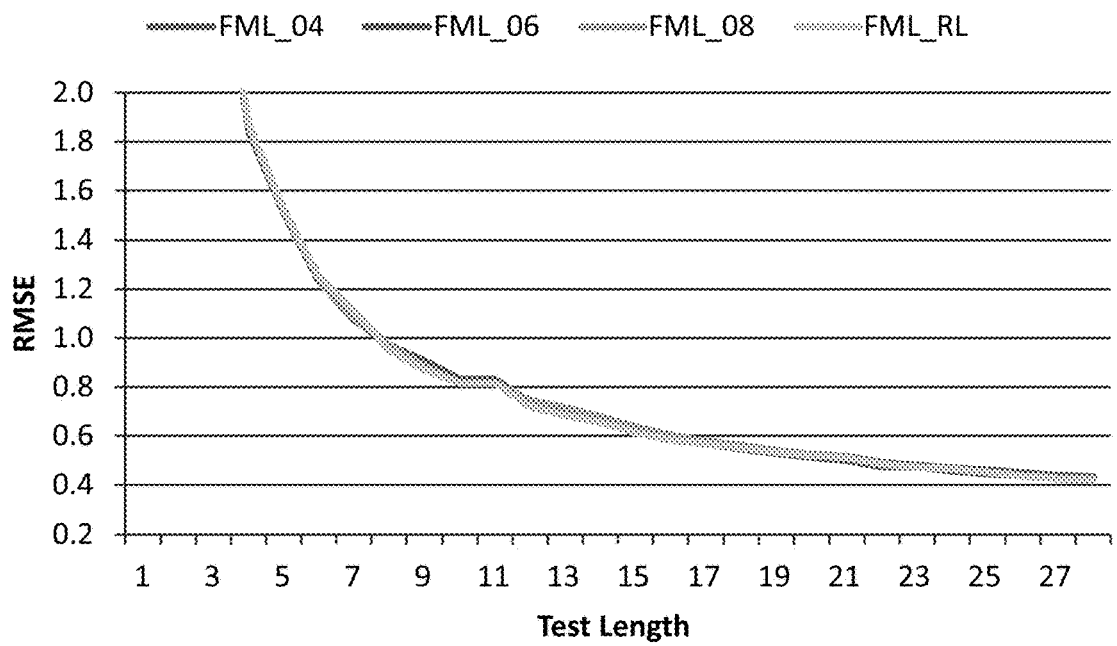
FIGS. 4(A-F) are pictorial representations in plot form for the RMSE theta at different test lengths of Sections 1 and 2 in accordance with an illustrative embodiment.
Figure 4B:
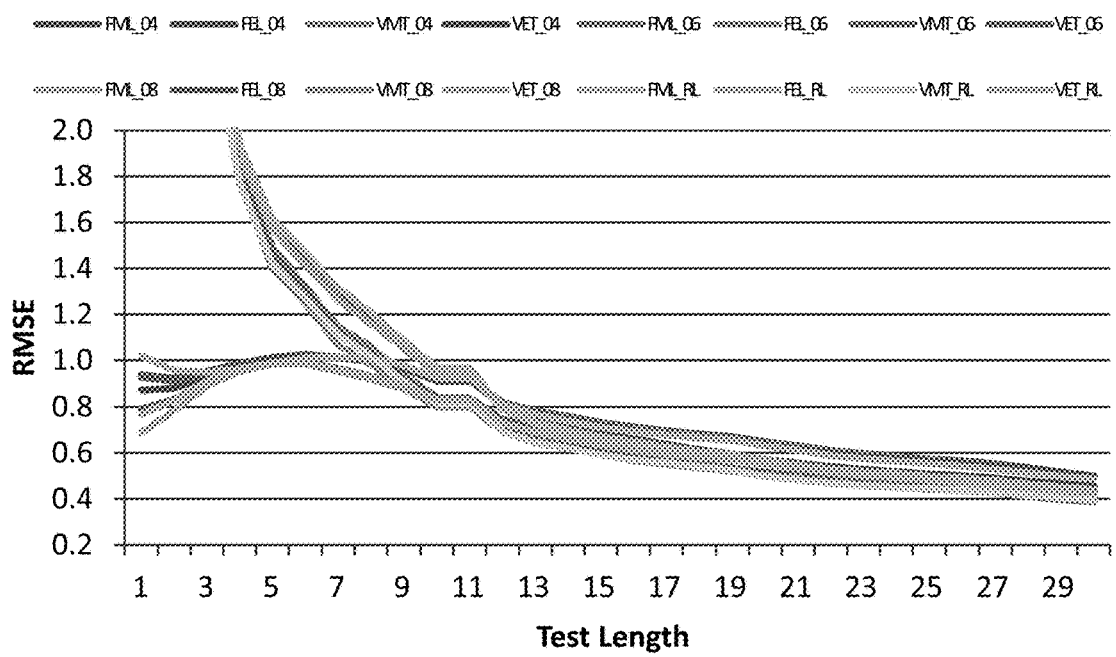
Figure 4C:
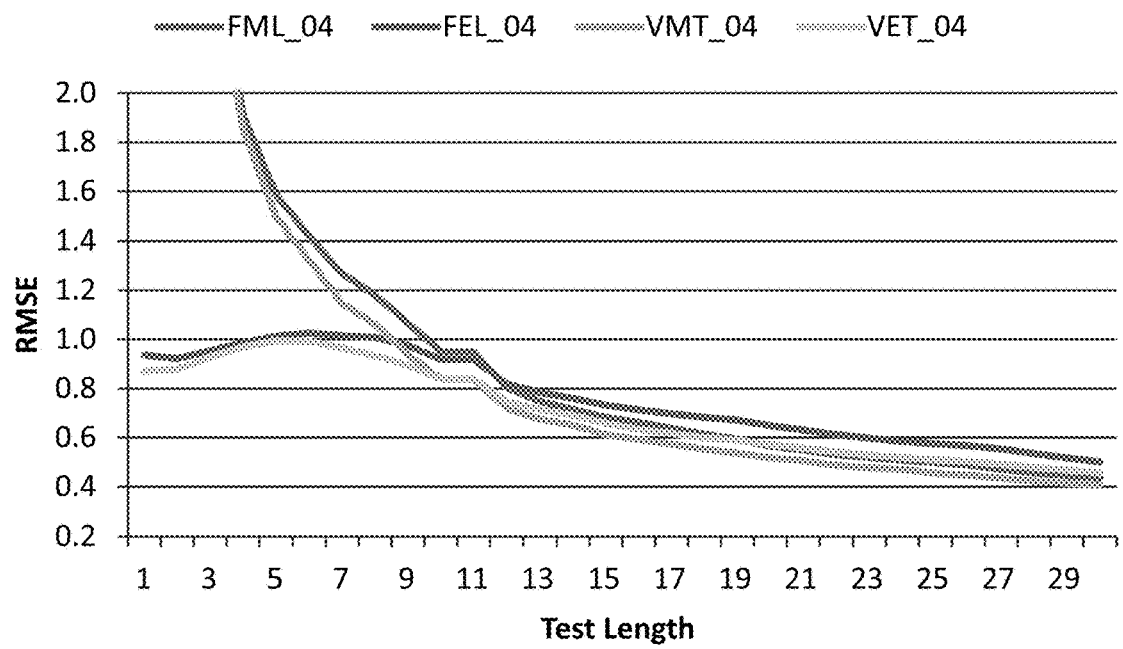
Figure 4D:
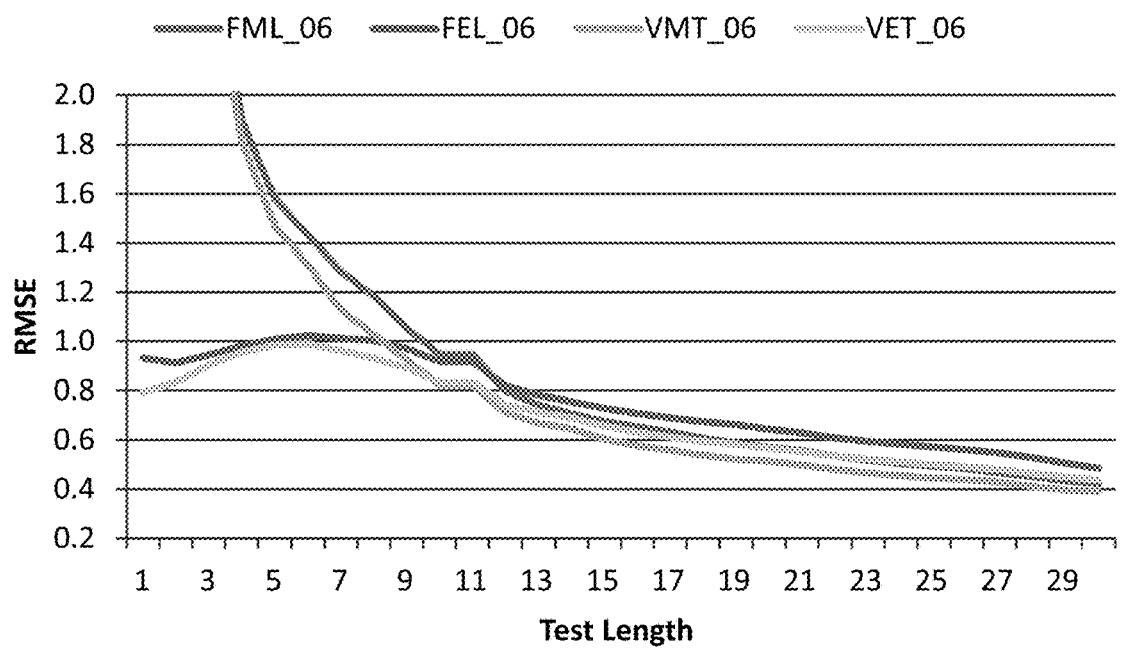
Figure 4E:
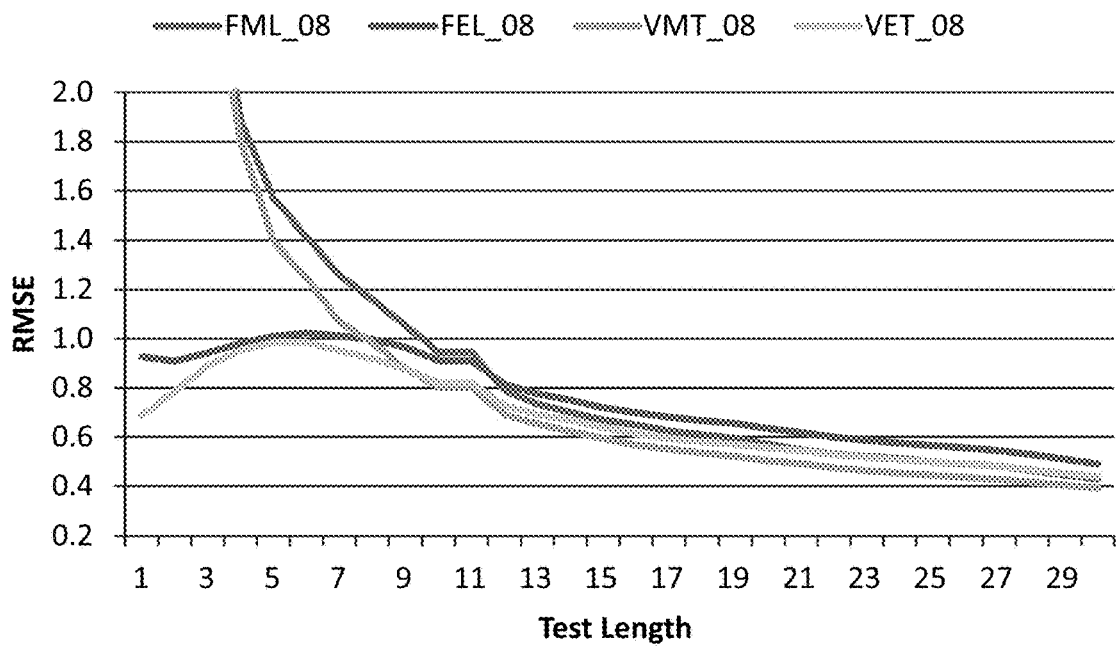
Figure 4F:
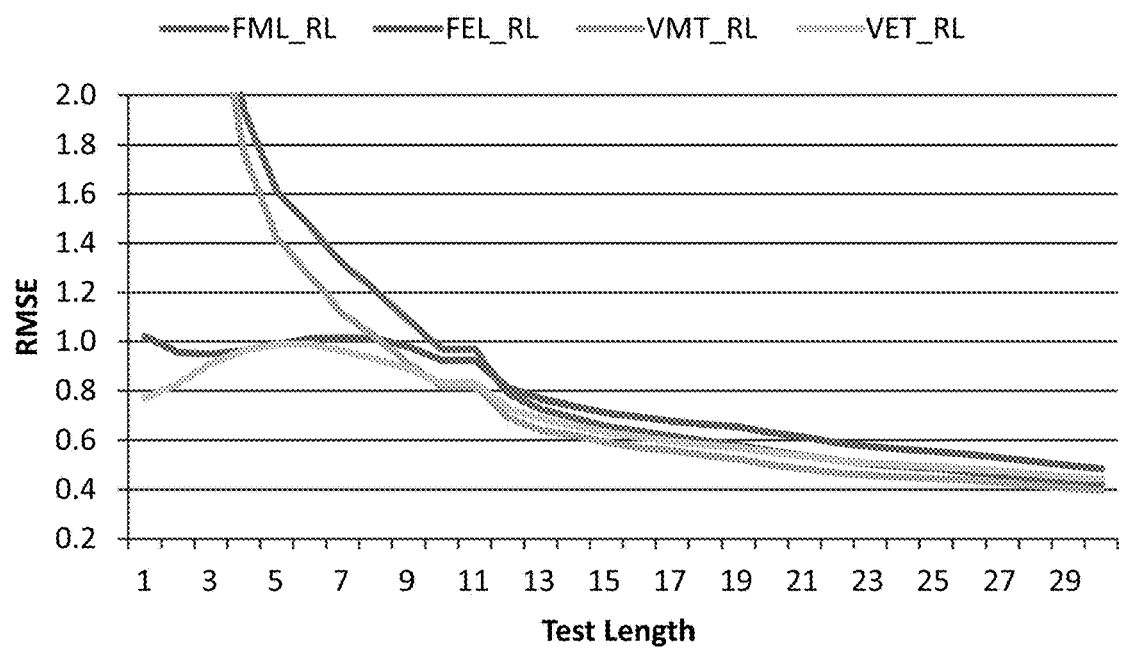

FIG. 1 provides an illustrative flowchart diagram for an exemplary process for item selection in CAT for a given test battery. Aspects of the disclosure contemplate interfacing with, displaying and receiving examinee input via a computer adaptive testing platform. A workstation, such as the one illustrated in FIG. 2, may be used to administer a computer implemented test battery. The workstation may be part of a computer network in which any embodiment of the present disclosure may be implemented. As shown, the workstation or computer network (not shown) includes, for example, a server, workstation, scanner, a printer, a datastore, and other linked networks. The computer networks may be configured to provide a communication path for each device of a computer network to communicate with other devices. Additionally, the computer network may be the internet, a public switchable telephone network, a local area network, private wide area network, wireless network and any of the like. In various embodiments, an automated computer adaptive testing module, operated, at least in part, by an operating protocol, may be executed on a server and/or workstation, similar to the workstation shown in FIG. 2. For example, in one embodiment or aspect of the application, the server may be configured to execute a computer adaptive testing module using an operating protocol individually or co-operatively with one or more workstations. The scanner may be configured to scan textual content and output the content in a computer readable format. Additionally, the printer may be configured to output the content to a print media, such as paper. Furthermore, data associated with any one of the computer adaptive testing modules, test script administration process or interim ability estimation process may be stored on the datastore. The datastore may additionally be configured to receive and/or forward some or all of the stored data. Moreover, in yet another aspect, some or all of the computer network or workstation may be subsumed within a single device. Although a workstation is depicted in FIG. 2, it is understood that the disclosure is not limited to operation within a computer workstation, but rather, the disclosure may be practiced in or on any suitable computer network or electronic device. Accordingly, the workstation depicted in FIG. 2 is for illustrative purposes only and thus is not meant to limit the present disclosure in any respect.

Using, for example, a test script administration process or application, a section or item selector is used to select a first test section from a test battery. The selected test section may be displayed using one of the aforementioned interface pieces or other like electronic device, whereby for example a plurality of test items from a first selected section are displayed. Through a workstation, computer network, or other like electronic device, examinees' input, answers or responses are received in response to the plurality of test items from a first selected section of a test battery being presented using a test scripted administration process or application. Operably configured on a workstation, such as the one illustrated in FIG. 2, a computer network or other like electronic device is an interim ability estimator using one or more estimation methods for calculating an examinee's ability estimate for the first selected section of test items for a test battery. In the following description, several estimation methods are discussed, which the interim ability estimator application or module may use to calculate an examinee's ability estimate for a first selected section of a plurality of test items in a test battery. One or more operating protocols on the workstation shown in FIG. 2, or a computer network, or another like electronic device may be used to inform selection of an initial test item for next test section in the test battery based upon an examinee's ability estimate from the first or previous selected section.

One comparative method selects a first item of a later section randomly from a pool of items most informative near the initial fixed theta value and then uses one or more estimation methods to estimate an examinee's interim ability. For example, the maximum likelihood (ML) estimator can be used to estimate an examinee's interim ability upon responding to each item, which was then used for selecting next items in subsequent sections of the test battery. Other exemplary methods herein use a Bayesian approach. The ability estimates from the first section may be used as prior information to select the first item of a subsequent or second section in a test battery. The expected a posteriori (EAP) estimation method can also be used at every step to obtain an examinee's interim ability which may then be used for selecting subsequent items in subsequent sections of a test battery.

II. Item Selection for Subsequent CAT Sections in a Test Battery

A test battery is usually composed of several related subtests or test sections based on content categories, such as reading and math. One of the features unique to test batteries is that a number of the abilities measured by a test battery are typically strongly correlated, such as reasoning and critical reading abilities. Thus, information about the examinee's ability measured by one section could be available in other sections. This interrelationship among different sections can be used to improve estimation accuracy and efficiency when selecting items for a later section(s). While van der Linden (1999) proposed the concept of using collateral information (e.g., an examinee's background information or a score from an earlier test) to inform item selection, what can be used as collateral information and how to use that information for adaptive test batteries has not been well researched. Further, using prior ability estimates to drive item selection for later test sections has not been widely applied in practice. What and how items are selected is essential for accurately and efficiently measuring examinee ability. Therefore, at least one object of the present disclosure is to provide an item selection procedure that is informed by previous section scores in order to improve ability estimation accuracy and item selection efficiency for subsequent sections of an adaptive test battery involving related tests or test sections.

In present disclosure, four (two control and two experimental) item selection procedures can be applied to the second section of a two-section (hereafter Section 1 and Section 2) adaptive test battery using both simulated and operational data with different distributions and correlations between abilities on the two sections. Different item selection procedures can be implemented through Generalized Scripted Testing, a standardized process governing item selection in a CAT administration. The psychometric properties and effectiveness of each procedure can be evaluated in terms of measurement precision and efficiency, test security, and item usage.

a. Illustrative Adaptive Testing Process

In CAT, an initial ability estimate is first selected to start the item selection process. Given the lack of response data at the beginning of the test, the initial ability estimate is usually an arbitrary value (e.g., 0 for all examinees) or a value inferred from relevant empirical information on the examinees (e.g., scores on earlier related tests). Based on the initial ability estimate, the first item is selected by some criterion such as maximum information that ability value or simply the closest match between ability and item difficulty. After the first item response, interim ability is estimated. The obtained interim ability can then be used to guide the selection of the subsequent item. In order for item exposure rates to be less than a target value, a selected item is administered with probability equal to that item's exposure control parameter, which can be estimated by, for example, the Sympson-Hetter method. This process continues until the test reaches its full length or satisfies certain termination rules. In the end, the final ability estimate can be computed to provide the examinee with a best possible score. Throughout the adaptive testing process, item selection and ability estimation go hand in hand. Estimation efficiency depends on the selection of appropriate items for an individual, and the appropriateness of items for an individual depends on the accuracy of ability estimates.

b. Illustrative Factors Affecting Estimation Accuracy and Efficiency

What item selection procedure should be used for an operational test battery can be a complicated question. The following, as previously discussed, reviews several major factors that need to be considered when choosing an item selection procedure.

c. Illustrative Initial Theta

It is known that when the initial ability estimate is far from the true ability, the item selection procedure can have a bad start. Prior studies have found that using a fixed starting point where variable starting points are needed may negatively affect estimation accuracy and item selection efficiency. Moreover, initialization at the same ability estimate for all examinees leads to selection of the same first items from an item pool. These items can become quickly overexposed, compromising test security. Nevertheless, in practice, the tests or test sections included in adaptive test batteries usually start with the same arbitrarily-chosen ability value for all examinees. No studies have been found using variable initial thetas informed by the interrelatedness between the test sections. Therefore, one question addressed in the present disclosure concerns whether initializing the subsequent section based on examinee performance on the previous section affects estimation accuracy and efficiency for the subsequent section of an adaptive test battery.

d. Illustrative Estimation Methods

Two estimation methods commonly used in CAT are maximum likelihood (ML) and expected a posteriori (EAP). The ML method involves maximizing the likelihood function over the range of possible theta values. In the case of dichotomous response data, the likelihood function that is maximized in ML estimation is denoted as, $$L_j(u_{i1}, u_{i2}, \ldots | \theta) \equiv \prod_{j=1}^{t-1} P(u_{ij} | \theta) \quad (1)$$

where t is the number of items administered, $u_{ij}$ is the response of an examinee i to the first j items, and $P(u_{ij}|0)$ is the probability that an examinee i with ability θ obtains response $u_{ij}$.

In the case where the item pool is calibrated using the three-parameter logistic (3-PL) model, the likelihood function associated with the responses to the first j items is $$L(u_{i1}, u_{i2}, \ldots u_{ij} | \theta) \equiv \prod_{j=1}^{t-1} \frac{\{\exp[a_j(\theta - b_j)]\}^{u_{ij}}}{1 + \exp[a_j(\theta - b_j)]} \quad (2)$$

where $a_j$ and $b_j$ represent, respectively, the discriminating power and difficulty of item j.

It is known that ML is consistent and asymptotically efficient for linear tests. In CAT where the items are selected to match examinee ability, the ML estimator significantly reduces the bias of theta estimation and the bias decreases as the number of items increases. This "virtually unbiased" property of the ML estimator makes it more attractive than the other estimators.

A limitation with the ML estimator, however, is its inability to obtain finite ability estimates when item responses are all correct or incorrect. This is especially problematic in CAT where extreme response patterns can appear in the early stage of testing but ability needs to be estimated after each item is administered. Typically, this issue is addressed by setting the ability estimate as the upper or lower theta limit (e.g., 5 or −5), until finite estimates are obtained. Of course, these arbitrarily forced ability values can be quite different from the true ability, which may contribute to an inefficient CAT process.

Another concern with the ML estimator is that a unique maximum or minimum for the likelihood function may not exist for the 3-PL model. While Lord (1980) observes that this is not a concern when the number of items is large, it poses a concern for a CAT, where ability is estimated after each item response. Others suggest that this issue might be minimized by using a good starting point that is an approximation of the true theta value. However, the effectiveness of this solution has not been well researched.

To overcome the limitation of infinite ability estimates of the ML estimator, Bayesian estimation methods were proposed. Such methods specify the prior information about the ability distribution, which determines the selection of the first item in the absence of response data. Expected a posteriori (EAP), a variation of empirical Bayesian estimation, is defined as the expected value of the posterior distribution of theta. After each item response, the EAP procedure updates the ability distribution by updating the mean and the standard deviation of the posterior distribution. The EAP theta estimate after item j is administered can be calculated as:

$$\hat{\theta}_j \equiv E(u | \theta) = \frac{\sum_{k=1}^{q} X_k L_j(X_k) W(X_k)}{\sum_{k=1}^{q} L_j(X_k) W(X_k)} \quad (3)$$

The error variance of the EAP estimate is the variance of the posterior distribution. The computational formula for the posterior variance is:

$$\hat{\sigma}^2(\hat{\theta}_{ij}) = \text{Var}(u \mid \theta) = \frac{\sum_{k=1}^{q}(X_k - \hat{\theta}_{ij})^2 L_j(X_k)W(X_k)}{\sum_{k=1}^{q} L_j(X_k)W(X_k)} \quad (4)$$

In Equations (3) and (4), $\hat{\theta}_j$ represents the EAP estimate of the ability of person i given his/her response to item j in an adaptive test. $\hat{\sigma}^2(\bar{\theta}_j)$ represents the posterior variance, k represents the number of quadrature points, and $X_k$ is one of q quadrature points. $W(X_k)$ is the weight associated with quadrature point $X_k$, equal to the prior density at $X_k$. The weights are normative probabilities. Hence, the sum of the weights is always 1. $L_j(\theta)$ is the likelihood of θ given the response pattern [$x_1, x_2, \ldots, x_j$] (see Equation 1 for the likelihood function).

The EAP estimator has three major advantages. First, it always exists even when the response patterns are extreme or only one item has been administered. Second, as the EAP estimator involves summation instead of an iterative process, it is easier to compute and is not prone to local maxima. This feature speeds up the item selection process and adds to the efficiency of the test. Third, previous research studies have found that on the early stages of a CAT, the EAP estimator produces smaller mean squared errors than the ML estimator.

Nevertheless, caution needs to be exerted when explaining the EAP results. EAP estimates shrink toward the mean of the prior distribution, which results in a reduction of the variance of the ability estimates. The bias incurred by shrinkage could reduce or even reverse the apparent relative superiority of the EAP estimates. Additionally, any inappropriate prior can affect accuracy of the estimate. Prior research has also found that the EAP estimate approaches true theta only when the number of items approaches infinity. When evaluating the performance of the ML versus EAP estimators, the effect of the above-mentioned factors on the accuracy of EAP estimates can be considered. To help decide which item selection procedure is suitable for adaptive test batteries including related test sections, all results of the present disclosure are presented for both ML and EAP estimation methods.

e. Illustrative Prior in Bayesian Estimation Methods

Another factor that needs to be considered is how to specify the prior in Bayesian estimation methods. When the prior is incorrect or the prior distribution does not adequately represent the true ability distribution, the initial ability estimates can be inappropriately biased and the estimation process can be inefficient due to the longer initial string of all correct or incorrect responses. As the prior affects the posterior distribution, the accuracy of interim ability estimates can be affected at the selection phase. Prior studies have shown that the closer the prior distribution to the true ability distribution, the more accurate the estimation and the smaller the bias and RMSEs.

Generally, when the theta distribution is unknown, assuming the prior distribution of examinee abilities as a standard normal distribution N (0,1) can be better than selecting an inappropriate prior. However, a normal prior may not be an optimal choice when there is a well-supported rational for using a more appropriate prior distribution, such as the ability distributions obtained from a previous test or extensive knowledge of the underlying distribution. For test batteries involving related test sections, predicting the prior distribution on a later section based on examinee performance on an earlier section(s) can be a better choice. For example, others have found that bias can be eliminated when using empirically-based theta distributions as a prior for the EAP estimator. Information used in the prior and how that information is used are critical for Bayesian estimation accuracy and CAT efficiency.

f. Illustrative Selection Length(s)

Selection length could be another factor affecting estimation accuracy and efficiency, and thus should be considered when choosing an item selection procedure. Selection length refers to the number of items contained in a subset of items meeting content and statistical requirements, from which an item is selected to present. Selecting the single 'best' item based on the content and statistical criteria would likely result in more accurate and efficient estimation than randomly selecting an item from a large subset of items meeting the same criteria. However, overexposure of such items and uneven use of pool items could pose an item security concern in practice. Hence, when choosing an item selection procedure for an adaptive testing program, consideration should be given to how selection length is defined so as to improve estimation accuracy and efficiency without compromising test security and item usage.

g. Illustrative Generalized Scripted Testing (GST): A Standardized Item Selection Process Applicant's generalized scripted testing (GST) provides a standardized item selection process through the use of scripts (i.e., a set of rules governing the item selection process). Compared to traditional item selection procedures, scripted item selection enables more control of item selection, item exposure, and item usage, thus improving test efficiency, test security, and use of the item bank. Table 1 provides an example script. In the table, "slot" refers to the sequence number of the items in a test. "Item Collection" refers to a set of items that satisfy certain content conditions. "MinTab" (Minimization Table) is the criterion used to select items from all Item Collection, for example, maximum information criterion. In the present disclosure, the absolute difference between item difficulty and interim theta can be used as the minimization statistic in selecting items. "SelFact" (Selection Factor) refers to the number of items contained in a subset of items that satisfy the content and statistical requirements. Also in the present disclosure, items can be randomly selected from a subset of items near the theta estimates and satisfying the content and statistics conditions. Lastly, the "step size" for each slot is used to determine the interim theta when it can't be estimated by ML due to lack of correct/incorrect response patterns. An example would be using initial theta plus 3 for an all correct response pattern.

TABLE 1

Example Script for GST

| Slot # | IC[a] | #Items in IC | MinTab[b] | SelFact | StepSize |
|---|---|---|---|---|---|
| 1 | 8 | 32 | 2 | 32 | 3 |
| 2 | 10 | 32 | 2 | 30 | 3 |
| 3 | 2 | 30 | 2 | 28 | 3 |
| 4 | 5 | 25 | 2 | 18 | 3 |
| 5 | 3 | 25 | 2 | 15 | 1 |
| 6 | 9 | 30 | 2 | 7 | 1 |
| 7 | 6 | 30 | 2 | 6 | 1 |

TABLE 1-continued

Example Script for GST

| Slot # | IC[a] | #Items in IC | MinTab[b] | SelFact | StepSize |
|---|---|---|---|---|---|
| 8 | 4 | 30 | 2 | 5 | 1 |
| 9 | 1 | 20 | 2 | 4 | 0 |
| 10 | 7 | 6 | 2 | 3 | 0 |

[a]IC represents Item Collection.
[b]MinTab refers to the statistical criterion for selecting items from all ICs, e.g., "2" represents the use of match between item difficulty and interim theta estimates.

h. Illustrative Item Selection Procedures

In a CAT, test items are selected based on examinee performance on previous items, with the intent of matching item difficulty to estimated examinee ability. In the present disclosure, the concept is extended to test batteries, where item selection in subsequent test section(s) takes into account the examinee's performance on the previous section (s). Specifically, for each individual examinee, the initial theta on the subsequent section is predicted by his/her ability on an earlier related test section(s). When EAP estimator is used, the prior is based on the ability estimates obtained from the earlier section(s). Further, given that the initial and interim thetas are closer to true abilities after incorporating information from previous related sections, tightened selection factors (i.e., a much smaller subset of items is identified from which to select the next item based on some minimization statistic) are used throughout the administration process to target item selection at each step to the more accurate ability estimates.

Compared to the traditional item selection procedure for adaptive test batteries, the procedure proposed in the present disclosure has several advantages. First, the initial theta based on examinee performance on earlier related test section(s) provides an individualized and more accurate start, which can improve ability estimation accuracy and item selection efficiency for the subsequent items. Second, empirical initialization of the test also means a variable entry point to the pool, and as a result, more even exposure and usage of the pool items. This is obviously advantageous over the traditional practice, where a fixed initial theta value is assigned to all examinees and the first several items become quickly overexposed due to always being chosen from the same subset in the pool. Third, the EAP prior based on each examinee's performance on the earlier section(s) provides an individualized prior close to each examinee's true ability and an edge to Bayesian ability estimation, which increases the accuracy of ability estimation and reduces the bias. This informative prior is consecutively updated using additional information from the individual examinee's item responses to improve the accuracy of interim thetas and speed up the convergence of the ability estimates, which improves test efficiency and makes a shorter test possible. Fourth, given the more accurate ability estimates throughout the testing process, a tightened selection factor at each step further improves selection efficiency and ensures a closer match between difficulty of selected items and examinee abilities. Finally, the use of GST for the CAT administration standardizes the item selection process and improves test security, and item usage.

To evaluate the performance of this proposed procedure, it was compared to the commonly used procedure, where item selection for the subsequent section is unrelated to scores on the previous section. To help decide which item selection procedure is most suitable for adaptive test batteries, all results of this study are presented for both ML and EAP estimation methods. Hence, four (two base and two experimental) item selection procedures are provided in the present disclosure. The first base procedure, Fixed ML Loose (FML), used a fixed initial theta on the second section for all examinees, the ML estimator, and a loose selection factor for the first few items (i.e., a large subset of items was identified from which to randomly select the next item based on some minimization statistic). The second base procedure, Fixed EAP Loose (FEL), is the same as the first one, except that the EAP estimator was used, with the prior following the standardized normal distribution N (0, 1). In the first experimental procedure, Variable ML Tighten (VMT), the initial thetas were predicted by each examinee's ability on the previous section. The interim and final abilities were estimated using the ML method. Tightened selection factors were used throughout the administration process to match item difficulty with ability estimates more closely. The second experimental procedure, Variable EAP Tighten (VET), was the same as the first experimental procedure, except for the use of EAP, with the prior based on the ability estimates from the previous section.

To evaluate the generalizability of the comparison results, the four procedures were first examined at three different levels of relatedness between the test sections: 0.4, 0.6, and 0.8, using the simulated data. Based on prior research, 0.4 is a realistic value for correlation between student abilities in two subtests on different content categories, such as math and writing. The correlation of 0.6 represents the scenario where the constructs of the two sections are moderately correlated, such as the quantitative and verbal reasoning subtests in proficiency tests. The correlation of 0.8 illustrates the scenario where the constructs of the two sections are more strongly correlated, such as Algebra and Geometry subtests in a math test battery.

The simulated data are advantageous at controlling different factors, studying the effect of the factors of interest, and producing precise and stable results. However, the results from the real data sample have the advantage of corresponding to actual operation, augmenting the findings from the simulated data, and providing better guidance to testing programs. To mimic authenticity, the four procedures can also be used on an operational adaptive test battery.

i. Illustrative Samples

Four samples, each with N=10,000, were used in this study. The first three were simulated from a standardized multivariate normal distribution on a truncated theta metric with the range of [−5, 5]. The correlation between abilities on the two sections was controlled at 0.4, 0.6, and 0.8, respectively, to represent different degrees of interrelatedness between the two sections in real testing programs. The last sample was randomly drawn from the candidate data files from an adaptive test battery. This sample features a moderate inter-ability correlation between the two test sections (0.64) and negatively skewed ability distributions on both sections (Mean$_{Sec1}$=0.26, SD$_{Sec1}$=1.13; Mean$_{Sec2}$=0.47, SD$_{Sec2}$=1.01). The ability distributions of the last sample on the two sections were on the same theta metric as that for the three simulated samples. The abilities of each sample on the two sections served as true abilities in the CAT simulations.

j. Illustrative Test and Item Pools

Two separate item pools and delivery scripts from one administration of the above-mentioned test battery were used for CAT simulations. This fixed-length adaptive battery contains two sections. Section 1 consists of 28 items. Section 2 consists of 30 items. The pool for Section 1 had a total of 702 items. The pool for Section 2 had a total of 672 items. Within both pools, the item parameters were calibrated using the three-parameter logistic item response theory model. Using these empirical item parameters and simulees' true abilities, item responses under various conditions were simulated.

k. Illustrative CAT Simulation Procedures

As mentioned previously, the proposed item selection procedure for the subsequent section of a test battery can be evaluated against the regular item selection procedure, where the initial ability was fixed at the same value for all examinees. The ability estimates were obtained using two estimation methods: ML and EAP. Accordingly, two base procedures, Fixed ML Loose (FML) and Fixed EAP Loose (FEL), and two experimental procedures, Variable ML Tighten (VMT) and Variable EAP Tighten (VET), can be applied to the second section in the CAT simulations. Further, to evaluate the generalizability of the results, the four procedures were first tested using the simulated samples with different degrees of relatedness between the two sections, and then using a real data sample with negatively skewed ability distributions and a moderate inter-ability correlation between the sections. Hence, the CAT simulations involved a total of 16 conditions (i.e., four item selection procedures by four samples). Since item selection for the first section is not focus in this particular instance, Section 1 was administered with the FML base procedure only in all cases.

All simulations can be conducted using the previously mentioned GST item selection system. In all procedures, the same estimation method can be used for estimating the interim and final thetas. Based on ability estimates, the subsequent item was selected from a subset of items satisfying test blueprint and having close match between item difficulty and examinee ability. The fixed test length rule can be adopted to terminate an adaptive testing session. In the case where ML estimator is used and the response pattern is constant, the upper bound of the theta interval, 5, is assigned if all responses are correct and the lower bound of the theta interval, −5, is assigned if all responses are incorrect.

Table 2 summarizes the CAT simulation procedures for each sample. As the table shows, Section 1 was administered using the base procedure, FML, only. The ability estimator was initialized at $\hat{\theta}_0 = -0.00884107$ for all simulees to represent the mean ability of the population. The interim and final abilities were estimated using the ML estimator. The administration of Section 1 terminated after the section was administered in full length. The final ability estimates obtained from Section 1 were used to inform the item selection for Section 2 in the experimental procedures.

The adaptive process for Section 2 is simulated using four procedures for each sample: FML, FEL, VMT, and VET. The FML procedure is the same as that for Section 1, except that the initial ability on Section 2 is set as 0.13358317 for all examinees. The FEL is similar to the FML procedure, except that an EAP theta score is computed after each item is administered, with a 0~N (0, 1) prior distribution. After the first item is administered, based on the prior distribution and response to the first item, the posterior ability distribution is adjusted, which then became the prior distribution in the subsequent ability estimation. After administering the second item, ability is estimated based on that updated prior ability distribution and responses to the first two items. In this way, the prior and ability estimates can be consecutively updated after each subsequent item is administered until the fixed test length is reached.

Different from the two base procedures, FML and FEL, the two experimental procedures, VMT and VET, involved the use of 1) empirical initial thetas on Section 2 predicted by the final theta estimates on Section 1, and 2) a smaller selection factor throughout the test administration process. At each step of item selection, the item can be randomly selected from the subset of three items satisfying the test blueprint and having the best match between item difficulty and ability estimates. Additionally, in concert with the individualized initial ability estimates for the subsequent section, the prior density in the VET procedure was also individualized based on each examinee's performance on the earlier section. That is, for each examinee, the mean of his/her prior distribution is the Section 2 initial ability estimate predicted by his/her final theta estimate on Section 1. Given that the standard deviation of the ability distributions on Section 2 is 1 for the three simulated samples and close to 1 for the real data sample, the standard deviation of the prior distribution can be set as 1 for all examinees in VET.

TABLE 2

Simulation Procedures for Each Sample

| Procedure | Initial $\theta^a$ | Prior | Interim & final $\hat{\theta}$ Estimator | Selection Factor[b] |
|---|---|---|---|---|
| Section 1 |  |  |  |  |
| Base 1: FML | Fixed | — | ML | Loose |
| Section 2 |  |  |  |  |
| Base 1: FML | Fixed | — | ML | Loose |
| Base 2: FEL | Fixed | N (0, 1) | EAP | Loose |
| Experimental 1: VMT | Variable | — | ML | Tightened |
| Experimental 2: VET | Variable | (Sec 2 initial $\hat{\theta}$, 1) | EAP | Tightened |

[a]Fixed initial $\hat{\theta} = -0.01$; Variable initial $\hat{\theta}$ see Table 3.
[b]Loose means setting the selection lengths big enough for the first several items; Tightened means setting selection factor as 3 for all items.

As mentioned earlier, in VMT and VET, the variable initial theta estimates for Section 2 were predicted by final theta estimates on Section 1. Given different inter-ability correlations between the two sections, the variable initial thetas were calculated separately for each sample through three steps. First, scatter plots were drawn to examine whether a linear relationship held between the abilities on the two sections. Given that the scatter plots revealed clear linear relationship for all samples, the next step was to perform regression analyses to determine the models for using the ability on Section 1 to predict the ability on Section 2. For each simulated sample, the regression equation was computed based on all simulees in that sample (error DF=9998). The real data sample from the adaptive test battery mentioned earlier is randomly partitioned into two subsets. The regression equation is computed using one subset. $R^2$ was calculated to determine the extent to which each model explained the criterion. The last step is to cross-validate the regression models to examine how well the predictive relationship computed on one sample predicts the abilities of another sample or future test-takers. For each simulated sample, a second sample that is drawn following the same process is used for cross-validation. For the real data sample, the other data subset is used for cross-validation. The regression model computed using the first sample is applied to the second sample, where the abilities predicted by the model were compared to the abilities actually observed. The results of cross-validation showed that the differences between the predicted and observed abilities were negligible for all samples, indicating a good fit of the regression models to the data. Hence, for each sample, the intercept and slope of the regression model were applied to the final theta estimates on Section 1 to predict the variable initial thetas on Section 2. Table 3 displays the regression models used for computing the initial thetas on Section 2 for each sample.

TABLE 3

Regression Models for Calculating Variable Initial Thetas for Section 2

| Sample | r | Regression Equation | $R^2$ | RMSE |
|---|---|---|---|---|
| 1 | 0.40 | Sec2 $\hat{\theta}_0$ = −0.01094 + (0.39715 * Sec1 $\theta_{final}$) | 0.16238 | 0.91827 |
| 2 | 0.60 | Sec2 $\hat{\theta}_0$ = −0.00281 + (0.60516 * Sec1 $\theta_{final}$) | 0.35540 | 0.80654 |
| 3 | 0.80 | Sec2 $\hat{\theta}_0$ = −0.00379 + (0.80543 * Sec1 $\theta_{final}$) | 0.63652 | 0.60212 |
| 4 | 0.64 | Sec2 $\hat{\theta}_0$ = 0.30630 + (0.57165 * Sec1 $\theta_{final}$) | 0.41849 | 0.76987 | l. Illustrative Analyses

The measurement performance of each procedure is evaluated in terms of accuracy and efficiency of ability estimation, item exposure, and item usage. To evaluate estimation accuracy, how well the final theta estimates recovered the true thetas is examined. For both sections, estimation accuracy under various conditions is evaluated through the calculation of 1) descriptive statistics of the true thetas and the final theta estimates, 2) Pearson product-moment correlations between the true thetas and the final theta estimates, 3) estimation bias, and 4) root mean squared errors (RMSEs) of the theta estimates. Smaller bias and RMSE values indicate more precise estimation, and thus more robust procedure. The following equations illustrate the computation of bias and RMSE:

$$\hat{Bias} = \frac{\sum_{i=1}^{n}(\hat{\theta}_i - \theta_i)}{N} \quad (5)$$

$$\hat{RMSE} = \sqrt{\frac{\sum_{i=1}^{n}(\hat{\theta}_i - \theta_i)^2}{N}} \quad (6)$$

where $\hat{\theta}_i$ is the estimated ability of examinee i, $\theta_k$ is the true ability of examinee i, and N is the total number of simulees.

Estimation efficiency of each procedure was evaluated through examining the interim theta estimate computed after each item was administered. It was expected that for all procedures, as more items were administered, the ability estimates would become closer to the true thetas, and possibly became stable after a certain number of items were administered. However, depending on the procedure, estimation might become stable at different points in the testing process. For both sections, estimation efficiency under the various conditions was evaluated through the calculation of 1) descriptive statistics of the interim theta estimates, which were evaluated against the true thetas to examine whether, and if yes, where the theta estimates became stable, 2) bias of interim estimates, and 3) RMSEs of interim estimates.

In addition to estimation accuracy and efficiency, item exposure and usage rates under the various conditions were examined. In the present disclosure, item exposure rate is calculated as the number of times an item is administered divided by the total number of simulees in the CAT. Item usage is calculated as the percentage of the pool items that were used in the CAT.

m. Illustrative Results

This section presents the simulation results for the three simulated samples and the sample derived from the operational data when each item selection procedure is applied. For each sample, the results are reported on 1) precision of final ability estimates, 2) efficiency of ability estimation, 3) item exposure, and 4) item usage. The name of each simulation condition is presented using six characters. The first one represents how the initial theta estimate was decided (F for fixed and V for variable). The next character represents the estimation method used (M for ML and E for EAP). The third character defines what selection lengths were used (L for loose and T for tightened). The fourth character is the symbol "_". The last two characters define the sample used, with 04, 06, and 08 representing the inter-ability correlations of 0.4, 0.6, and 0.8 between the two sections, and RL representing the real data sample.

n. Illustrative Estimation(s) of Precision

For both sections, the final theta estimates obtained under the various conditions were evaluated against the true thetas. The results of evaluation are summarized sequentially by 1) descriptive statistics, 2) correlation, 3) bias, and 4) RMSE.

o. Illustrative Descriptive Statistics

Table 4 summarizes the descriptive statistics and distributions of the true thetas and the final theta estimates on the two sections under the various simulation conditions. For both sections, the true thetas (highlighted in bold) are presented first, followed by the final theta estimates. As the table shows, for Section 1, the FML base procedure is used on four samples. The true thetas and the final theta estimates of the real data sample are slightly negatively skewed and have higher mean and slightly wider dispersion than the three simulated samples.

For Section 2, while the dispersion of the four samples are similar, the true thetas and the final theta estimates of the real data sample under the various procedures are all negatively skewed, with a higher mean than the simulated samples. For each sample, their final theta estimates are slightly different across the four item selection procedures. Across all samples, the final theta estimates from the procedures using the ML estimator are within the range of [−5, 5], whereas those from the procedures using the EAP estimator have a larger range. Further, the final theta estimates computed using the ML estimator generally have lower skewness and kurtosis values than those using the EAP estimator. The distributions of the final theta estimates computed with the EAP estimator appeared to be closer to the mean and less flat than those computed with the ML estimator.

TABLE 4

Descriptive Statistics for Estimated and True Thetas

| Theta | N | Mean | SD | Min | Max | Skewness | Kurtosis |
|---|---|---|---|---|---|---|---|
| Section 1 | | | | | | | |
| $\theta_{04}$ | 10,000 | 0.0054 | 1.0180 | −4.1486 | 3.7491 | −0.0262 | 0.0243 |
| $\hat{\theta}_{FML\_04}$ | 10,000 | 0.0019 | 1.1238 | −5.0000 | 5.0000 | −0.3591 | 1.1328 |
| $\theta_{06}$ | 10,000 | −0.0165 | 0.9896 | −3.6769 | 4.1803 | −0.0109 | 0.0341 |

TABLE 4-continued

Descriptive Statistics for Estimated and True Thetas

| Theta | N | Mean | SD | Min | Max | Skewness | Kurtosis |
|---|---|---|---|---|---|---|---|
| $\hat{\theta}_{FML\_06}$ | 10,000 | −0.0215 | 1.0911 | −5.0000 | 5.0000 | −0.3022 | 1.0832 |
| $\theta_{08}$ | 10,000 | −0.0110 | 0.9892 | −4.1857 | 3.6890 | −0.0166 | 0.0037 |
| $\hat{\theta}_{FML\_08}$ | 10,000 | −0.0182 | 1.1003 | −5.0000 | 5.0000 | −0.3059 | 1.1612 |
| $\theta_{RL}$ | 10,000 | 0.2589 | 1.1311 | −5.0000 | 5.0001 | −0.5762 | 1.5997 |
| $\hat{\theta}_{FML\_RL}$ | 10,000 | 0.2641 | 1.2098 | −5.0000 | 5.0000 | −0.6193 | 1.8985 |
|  |  |  | Section 2 |  |  |  |  |
| $\theta_{04}$ | 10,000 | −0.0088 | 1.0033 | −4.2063 | 3.9851 | −0.0145 | 0.0707 |
| $\hat{\theta}_{FML\_04}$ | 10,000 | 0.0083 | 1.1109 | −5.0000 | 5.0000 | −0.2073 | 1.4007 |
| $\hat{\theta}_{FEL\_04}$ | 10,000 | −0.0373 | 1.1979 | −6.7677 | 6.7416 | −0.3821 | 2.9371 |
| $\hat{\theta}_{VMT\_04}$ | 10,000 | 0.0131 | 1.0922 | −5.0000 | 5.0000 | −0.1566 | 1.0213 |
| $\hat{\theta}_{VET\_04}$ | 10,000 | −0.0264 | 1.1515 | −7.0948 | 7.0663 | −0.3303 | 2.7475 |
| $\theta_{06}$ | 10,000 | −0.0128 | 1.0045 | −3.5592 | 3.7034 | 0.0006 | −0.1343 |
| $\hat{\theta}_{FML\_06}$ | 10,000 | 0.0094 | 1.1103 | −5.0000 | 5.0000 | −0.1288 | 0.9485 |
| $\hat{\theta}_{FEL\_06}$ | 10,000 | −0.0370 | 1.1934 | −6.9617 | 6.8462 | −0.3290 | 2.2963 |
| $\hat{\theta}_{VMT\_046}$ | 10,000 | 0.0106 | 1.0872 | −5.0000 | 5.0000 | −0.0399 | 0.4238 |
| $\hat{\theta}_{VET\_06}$ | 10,000 | −0.0273 | 1.1429 | −6.6819 | 7.1476 | −0.1938 | 1.8776 |
| $\theta_{08}$ | 10,000 | −0.0126 | 0.9987 | −3.6808 | 4.0782 | −0.0155 | −0.0295 |
| $\hat{\theta}_{FML\_08}$ | 10,000 | 0.0012 | 1.1117 | −5.0000 | 5.0000 | −0.2517 | 1.1140 |
| $\hat{\theta}_{FEL\_08}$ | 10,000 | −0.0446 | 1.1903 | −7.4355 | 7.1731 | −0.4640 | 2.2949 |
| $\hat{\theta}_{VMT\_08}$ | 10,000 | 0.0061 | 1.0833 | −5.0000 | 5.0000 | −0.1741 | 0.5845 |
| $\hat{\theta}_{VET\_08}$ | 10,000 | −0.0320 | 1.1362 | −7.0875 | 7.1680 | −0.3838 | 1.8613 |
| $\theta_{RL}$ | 10,000 | 0.4742 | 1.0060 | −5.0000 | 5.0001 | −0.2824 | 1.6494 |
| $\hat{\theta}_{FML\_RL}$ | 10,000 | 0.5098 | 1.1046 | −5.0000 | 5.0000 | −0.0442 | 1.8151 |
| $\hat{\theta}_{FEL\_RL}$ | 10,000 | 0.4904 | 1.1932 | −7.2167 | 7.0303 | 0.0305 | 4.3122 |
| $\hat{\theta}_{VMT\_RL}$ | 10,000 | 0.5024 | 1.0825 | −5.0000 | 5.0000 | −0.1028 | 1.5446 |
| $\hat{\theta}_{VET\_RL}$ | 10,000 | 0.4797 | 1.1518 | −7.6012 | 7.2542 | −0.0302 | 4.5439 | p. Illustrative Correlations

Table 5 presents the correlations between the true thetas and the final theta estimates for the two sections. For Section 1, the correlation between the true thetas and the final theta estimates are comparable across the three simulated samples (about 0.92), while that for the real data sample was relatively higher (0.94). For Section 2, the correlations under the various conditions were all above 0.91, and the correlations for each procedure across the four samples were all comparable. Within each sample, the correlations between the true thetas and the final theta estimates were higher for the two experimental procedures (VMT & VET) than for the two base procedures (FML & FEL). Further comparisons within the base and experimental procedures found that in all cases, the procedures using the ML estimator had higher correlations between the true and the final theta estimates than the procedures using the EAP estimator.

TABLE 5

Correlations between Estimated and True Thetas

| Condition | N | r | Condition | N | r |
|---|---|---|---|---|---|
|  |  | Section 1 |  |  |  |
| FML_04 | 10,000 | 0.9225 | — | — | — |
| FML_06 | 10,000 | 0.9217 | — | — | — |
| FML_08 | 10,000 | 0.9218 | — | — | — |
| FML_RL | 10,000 | 0.9385 | — | — | — |
|  |  | Section 2 |  |  |  |
| FML_04 | 10,000 | 0.9208 | FML_08 | 10,000 | 0.9227 |
| FEL_04 | 10,000 | 0.9119 | FEL_08 | 10,000 | 0.9149 |
| VMT_04 | 10,000 | 0.9286 | VMT_08 | 10,000 | 0.9324 |
| VET_04 | 10,000 | 0.9199 | VET_08 | 10,000 | 0.9237 |
| FML_06 | 10,000 | 0.9251 | FML_RL | 10,000 | 0.9247 |
| FEL_06 | 10,000 | 0.9170 | FEL_RL | 10,000 | 0.9165 |
| VMT_06 | 10,000 | 0.9339 | VMT_RL | 10,000 | 0.9310 |
| VET_06 | 10,000 | 0.9256 | VET_RL | 10,000 | 0.9247 | q. Illustrative Bias

Table 6 presents the bias of the final theta estimates for the two sections. For Section 1, the bias of estimation was the smallest at r=0.4 (−0.0036) and the largest at r=0.8 (−0.0072). For Section 2, the bias results showed that either FML or VET always produced the smallest bias across the various samples. However, the results did not reveal any meaningful patterns to explain this finding.

TABLE 6

Bias of the Theta Estimation

| Condition | N | Bias |
|---|---|---|
|  | Section 1 |  |
| FML_04 | 10,000 | −0.0036 |
| FML_06 | 10,000 | −0.0051 |
| FML_08 | 10,000 | −0.0072 |
| FML_RL | 10,000 | −0.0051 |
|  | Section 2 |  |
| FML_04 | 10,000 | 0.0171 |
| FEL_04 | 10,000 | −0.0285 |
| VMT_04 | 10,000 | 0.0218 |
| VET_04 | 10,000 | −0.0176 |
| FML_06 | 10,000 | 0.0222 |
| FEL_06 | 10,000 | −0.0242 |
| VMT_06 | 10,000 | 0.0233 |
| VET_06 | 10,000 | −0.0145 |
| FML_08 | 10,000 | 0.0138 |
| FEL_08 | 10,000 | −0.0320 |
| VMT_08 | 10,000 | 0.0187 |
| VET_08 | 10,000 | −0.0194 |
| FML_RL | 10,000 | 0.0356 |
| FEL_RL | 10,000 | 0.0162 |
| VMT_RL | 10,000 | 0.0283 |
| VET_RL | 10,000 | 0.0056 | r. Illustrative RMSE

Table 7 presents the RMSEs of theta estimation in the ascending order for both sections. For Section 1, the RMSEs are the smallest for the real data sample and the largest for the simulated sample with inter-ability correlation of 0.4 between the two sections. The RMSEs are comparable for the samples with inter-ability correlation of 0.6 and 0.8.

For Section 2, the RMSEs of the final theta estimates reveal a clear picture of the performance of each procedure under the various conditions. Several immediate features can be seen. First, across all samples, the rank orderings of the procedures in the ascending order of RMSEs are sequentially VMT, FML, VET, and FEL. It appears that regardless of the samples used, the experimental procedure, VMT, performed best, while the base procedure, FEL, performed worst in terms of overall estimation accuracy. Second, the results consistently show that in all cases, VMT and FML, the procedures using the ML estimator, produced smaller RMSEs than VET and FEL, the procedures using the EAP estimator. The final theta estimates computed with ML seemed to better recover the true thetas than those computed with EAP. Third, the results consistently show that no matter whether ML or EAP was used, the procedures using variable initial thetas and tightened selection factors throughout the test process produced smaller RMSEs than the procedures using fixed initial thetas and loose selection factors early on in the tests. Lastly, within each procedure, the RMSEs are comparable across the samples. The overall estimation accuracy does not appear to be affected by inter-ability correlation between the test sections.

TABLE 7

RMSE of Theta Estimation

| Condition | N | RMSE | Condition | N | RMSE |
|---|---|---|---|---|---|
| Section 1 ||||||
| FML_RL | 10,000 | 0.4179 | — | — | — |
| FML_06 | 10,000 | 0.4236 | — | — | — |
| FML_08 | 10,000 | 0.4274 | — | — | — |
| FML_04 | 10,000 | 0.4342 | — | — | — |
| Section 2 ||||||
| VMT_06 | 10,000 | 0.3896 | VET_06 | 10,000 | 0.4361 |
| VMT_08 | 10,000 | 0.3922 | VET_08 | 10,000 | 0.4385 |
| VMT_RL | 10,000 | 0.3961 | VET_RL | 10,000 | 0.4425 |
| VMT_04 | 10,000 | 0.4061 | VET_04 | 10,000 | 0.4553 |
| FML_RL | 10,000 | 0.4223 | FEL_06 | 10,000 | 0.4851 |
| FML_06 | 10,000 | 0.4228 | FEL_RL | 10,000 | 0.4855 |
| FML_08 | 10,000 | 0.4295 | FEL_08 | 10,000 | 0.4899 |
| FML_04 | 10,000 | 0.4341 | FEL_04 | 10,000 | 0.5005 | s. Illustrative Efficiency of Estimation

To evaluate which procedure provided the most accurate estimates at the shortest test length, and thus was the most efficient, descriptive statistics, bias, and RMSEs of the interim theta estimates under the various conditions were calculated for both sections. The stepwise results are further summarized in the following sections.

t. Illustrative Descriptive Statistics

For both sections, descriptive statistics of the interim theta estimates under each condition were calculated and evaluated against those of the true thetas. The evaluation included 1) whether the estimation became stabilized (i.e., the change from the previous theta estimate to the next ≤0.01) after administering a certain number of items, and if yes, at which item the estimation became stable, 2) whether, and if yes, where the estimation converged using the criterion of 0.01, and 3) how well the stepwise theta estimates recovered the true thetas using the criterion of 0.01.

Table 8 summarizes the evaluation results for both sections. Several observations can be made. First, the points where the estimates became stable were different under the various conditions. Generally, the estimates started to stabilize later when ML is used than when EAP is used. When ML is used, the estimation became stable at the $6^{th}$ to the $12^{th}$ item, depending on different conditions. However, when EAP is used, the estimation did not change dramatically from the start of the test. Second, using the convergence criterion of 0.01, the estimation process converged in all cases, though the points where the estimation converged were different under the various conditions. Again, the convergence is generally reached earlier when EAP is used than when ML is used. Finally, while estimation bias exists in most cases using the criterion of 0.01, the interim theta estimates at the convergence point recovered the true thetas under all conditions when the 0.1 criterion is used.

TABLE 8

Interim Theta Estimates vs. True Thetas for Both Sections

| Condition | Stabilized from Item | Converged[a] at Item | Recovered $\theta$[b] |
|---|---|---|---|
| Section 1 ||||
| FML_04 | 9 | 19 | N |
| FML_06 | 6 | 23 | Y |
| FML_08 | 6 | 19 | N |
| FML_RL | 8 | 24 | Y |
| Section 2 ||||
| FML_04 | 8 | 24 | N |
| FEL_04 | 2 | 17 | N |
| VMT_04 | 8 | 27 | N |
| VET_04 | 2 | 18 | N |
| FML_06 | 9 | 24 | N |
| FEL_06 | 2 | 20 | N |
| VMT_06 | 6 | 22 | N |
| VET_06 | 2 | 21 | N |
| FML_08 | 8 | 24 | N |
| FEL_08 | 2 | 15 | N |
| VMT_08 | 6 | 19 | N |
| VET_08 | 2 | 18 | N |
| FML_RL | 12 | 28 | N |
| FEL_RL | 7 | 15 | N |
| VMT_RL | 8 | 27 | N |
| VET_RL | 2 | 14 | N |

[a]Use the convergence criterion of 0.01.
[b]Use the recovery criterion of 0.01.

u. Illustrative Bias

FIGS. 3(A-F) present the bias of the interim theta estimates for both sections. For Section 1, the FML base procedure on the four samples was plotted within the same graph.

As the figure shows, the bias of each stepwise estimation is almost identical for the samples with inter-ability correlation of 0.6 and 0.8 between the two sections. At the early stage of the test, the real data sample appeared to have larger bias than the three simulated samples. Overall, the bias differed among the samples for the first nine items. With more items administered, the difference among the samples kept decreasing, and the inter-ability correlation between the sections did not seem to impact bias much after the 15th item. For Section 2, the graphs under all conditions were plotted within the same figure first, followed by a separate graph for each sample. The graph containing all conditions showed that, when FML is used for the real data sample, the bias appeared to be the largest among all conditions. Additionally, the procedures using ML had larger bias than those using EAP for the first several items. However, the difference among the procedures kept decreasing with the increasing test lengths. Further examination of the graph for each sample revealed the similar pattern across the samples. In all cases, the bias lines for the two procedures using the same estimators were close to each other. The bias of the procedures using the EAP is small and consistent throughout the test process, whereas the bias of the procedures using the ML was ostensibly large for the first eight items. While the difference among the procedures became less obvious as more items were administered, the experimental procedures, FEL and VET, appeared to have smaller bias than base procedures, FML and VMT, throughout the test process and across all samples.

v. Illustrative RMSE

FIGS. 4(A-F) provide graphical descriptions of the RMSEs at different test lengths for the two sections. For Section 1, where the FML procedure was applied to the different samples, the RMSEs of the interim theta estimates did not reveal noticeable differences among the samples. In all cases, the RMSEs were large for the first few items, but reduced with the increase in test length. The changes in the RMSEs became negligible after the $25^{th}$ item, though the RMSEs did not appear to stabilize throughout the process. For Section 2, the figure consistently showed that regardless of the samples used, for the first eight items, the procedures using ML had apparently larger RMSEs than the procedures using EAP. Then, the FML procedure had slightly larger RMSEs than the VET procedure. After the $12^{th}$ item, the RMSEs were the largest for FEL, the smallest for VMT, and comparable between FML and VET across all samples. Generally, the difference in the RMSEs among the procedures decreased as more items were administered. Of the two procedures using the ML, the experimental procedure, VMT, had smaller RMSEs than the base procedure, FML, throughout the process and across all samples. A similar pattern is found for the VET and FEL procedures. It appears that regardless of the estimators used, the experimental procedures had smaller RMSEs than the base procedures.

w. Illustrative Exposures

Table 9 summarizes the exposures of Section 1 and Section 2 items delivered to simulees under the various conditions. Note that different from real administrations where multiple scripts are used to alleviate item exposure and even out item usage, only one script is used for each section in the simulations. Hence, item exposure results from this simulation study can be further improved in operation by using multiple scripts. Several notable findings can be observed from the table. First, across the four samples, all items of Section 1 that were administered using the FML procedure had an exposure rate ≤0.2, of which more than 98% items had an exposure rate ≤0.1. Second, for Section 2, in most cases, item exposure rates were below 0.1. Only a small percentage of the items had exposure rates within the range of (0.1, 0.2], and negligible percentages of items fell in the category of (0.2, 0.3] when experimental procedures VMT and VET were applied to the real data sample. Third, across all samples, item exposures of the experimental procedures were slightly higher than those of the base procedures. A likely reason is that some items were more frequently used as a result of the tightened selection factors in the experimental procedures. Fourth, in all cases, item exposures of the procedures using the EAP were slightly better than those of the procedures using the ML. Lastly, item exposures were slightly higher when real data sample was used.

TABLE 9

Item Exposures for Sections 1 and 2 under Various Conditions

| Condition | (0, 0.1] | | (0.1, 0.2] | | (0.2, 0.3] | |
|---|---|---|---|---|---|---|
| | N | % | N | % | N | % |
| Section 1 | | | | | | |
| FML_04 | 688 | 98.85 | 8 | 1.15 | — | — |
| FML_06 | 685 | 98.42 | 11 | 1.58 | — | — |
| FML_08 | 685 | 98.42 | 11 | 1.58 | — | — |
| FML_RL | 694 | 99.71 | 2 | 0.29 | — | — |
| Section 2 | | | | | | |
| FML_04 | 660 | 98.51 | 10 | 1.49 | — | — |
| FEL_04 | 664 | 98.81 | 8 | 1.19 | — | — |
| VMT_04 | 591 | 93.07 | 44 | 6.93 | — | — |
| VET_04 | 644 | 95.83 | 28 | 4.17 | — | — |
| FML_06 | 658 | 98.21 | 12 | 1.79 | — | — |
| FEL_06 | 661 | 98.36 | 11 | 1.64 | — | — |
| VMT_06 | 594 | 93.54 | 41 | 6.46 | — | — |
| VET_06 | 643 | 95.68 | 29 | 4.32 | — | — |
| FML_08 | 658 | 98.21 | 12 | 1.79 | — | — |
| FEL_08 | 664 | 98.81 | 8 | 1.19 | — | — |
| VMT_08 | 592 | 93.23 | 43 | 6.77 | — | — |
| VET_08 | 640 | 95.24 | 32 | 4.76 | — | — |
| FML_RL | 631 | 94.18 | 39 | 5.82 | — | — |
| FEL_RL | 643 | 95.68 | 29 | 4.32 | — | — |
| VMT_RL | 577 | 90.87 | 53 | 8.35 | 5 | 0.79 |
| VET_RL | 624 | 92.86 | 47 | 6.99 | 1 | 0.15 | x. Illustrative Item Usage

Table 10 presents the total number of items used in the pool for Section 1 and Section 2, respectively. The pool for Section 1 contained 702 items, of which 696 items (99.1%) were used across all sample conditions. The pool for Section 2 contained 672 items, all of which were used when EAP was the estimator. When the FML procedure is applied to the four samples, 670 out of 672 (99.7%) items were used. The VMT procedure produced the lowest item usage rate (94.5%) across the four samples. Again, given that only one script is used for each measure in the simulations, such item usage rates were considered reasonably high and could be further improved by using multiple scripts in operation.

TABLE 10

Section 1 and Section 2 Items Used in the Corresponding Pools under Various Conditions

| Condition | #Items Used | #items in Pool | % | Condition | #Items Used | #items in Pool | % |
|---|---|---|---|---|---|---|---|
| Section 1 Items Used in the Corresponding Pool | | | | | | | |
| FML_04 | 696 | 702 | 99.15 | | — | — | — |
| FML_06 | 696 | 702 | 99.15 | | — | — | — |
| FML_08 | 696 | 702 | 99.15 | | — | — | — |

TABLE 10-continued

Section 1 and Section 2 Items Used in the Corresponding Pools under Various Conditions

| Condition | #Items Used | #items in Pool | % | Condition | #Items Used | #items in Pool | % |
|---|---|---|---|---|---|---|---|
| FML_RL | 696 | 702 | 99.15 | — | — | — | — |

Section 2 Items Used in the Corresponding Pool

| FML_04 | 670 | 672 | 99.70 | FML_08 | 670 | 672 | 99.70 |
| FEL_04 | 672 | 672 | 100.00 | FEL_08 | 672 | 672 | 100.00 |
| VMT_04 | 635 | 672 | 94.49 | VMT_08 | 635 | 672 | 94.49 |
| VET_04 | 672 | 672 | 100.00 | VET_08 | 672 | 672 | 100.00 |
| FML_06 | 670 | 672 | 99.70 | FML_RL | 670 | 672 | 99.70 |
| FEL_06 | 672 | 672 | 100.00 | FEL_RL | 672 | 672 | 100.00 |
| VMT_06 | 635 | 672 | 94.49 | VMT_RL | 635 | 672 | 94.49 |
| VET_06 | 672 | 672 | 100.00 | VET_RL | 672 | 672 | 100.00 |

III. Other Embodiments and Variations

The present disclosure is not to be limited to the particular embodiments described herein. In particular, the present disclosure contemplates numerous variations in the type of ways in which embodiments of the disclosure may be applied to computer adaptive testing. The foregoing description has been presented for purposes of illustration and description. It is not intended to be an exhaustive list or limit any of the disclosure to the precise forms disclosed. It is contemplated that other alternatives or exemplary aspects that are considered are included in the disclosure. The description is merely examples of embodiments, processes or methods of the invention. For example, the algorithm, processor method used to select an initial item in a subsequent section based upon ability estimates from a previous section are not limited to those disclosed herein. It is understood that any other modifications, substitutions, and/or additions may be made, which are within the intended spirit and scope of the disclosure. For the foregoing, it can be seen that the disclosure accomplishes at least all of the intended objectives.

What is claimed is:

1. A method of test item selection comprising; providing a computer and computer implemented test battery comprising:
a plurality of test sections in the computer implemented test battery, each test section having a set of test items selected from a plurality of test items; and
an item selection process;
displaying, on graphical user interface, a set of test items selected from a first test section selected from the plurality of test sections;
obtaining, with a computer adaptive testing component, a set of examinee responses to the set of test items in the first test section;
calculating, with an interim ability estimator, an estimate of an examinee's interim performance based on the examinee responses to the set of test items from the first section, the interim ability estimator comprising a maximum likelihood (ML) estimator or an Expected a Posteriori (EAP);
selecting, with the computer adaptive testing component, a second test section from the plurality of test sections;
selecting, with the computer adaptive testing component, an initial test item from the second test section based on the estimate of the examinee's performance from the first test section;
displaying the initial test item from the second test section on the graphical user interface; and
calculating, with the interim ability estimator, an estimate of an examinee's interim performance based on the examinee's responses to the set of test items from the second test section, wherein the interim estimate is based on the relationship:

$$\hat{\theta}_j \equiv E(u|\theta) = \frac{\sum_{k=1}^{q} X_k L_j(X_k) W(X_k)}{\sum_{k=1}^{q} L_j(X_k) W(X_k)}.$$

2. The method of claim 1 further comprising:
calculating an initial ability estimate from the examinee's performance on the set of test items from the first test section.

3. The method of claim 2 further comprising:
basing the test item for at least one subsequent test section on the initial ability estimate.

4. The method of claim 1 wherein the computer implemented test battery comprises a computer adaptive test battery further comprising related tests or test sections.

5. The method of claim 1 further comprising: matching item difficulty in the at least one subsequent section with an estimated examinee ability from the first test section or a previous test section.

6. The method of claim 1 further comprising:
improving interim ability estimation accuracy and item selection efficiency by informing the item selection process with ability estimates from the first test section or previous test sections.

7. A method of test item selection comprising:
providing a computer and a computer implemented test battery comprising at least two or more test sections having a plurality of test items;
administering a first section of the at least two or more test sections to an examinee using the computer, wherein the computer receives an examinee's performance to the set of the plurality of test items in the first test section; and
calculating an initial ML or an EAP ability estimate for the examinee's performance on the set of the plurality of test items in the first test section; and
selecting one or more test items from the plurality of test items to include in a subsequent test section to the first test section of the at least two or more test sections based upon the initial ability estimate from at least the first test section; and calculating an interim ability estimate, the interim ability estimate comprising an ML ability estimate or an EAP estimate from the examinee's performance on the set of plurality of test items in the second section, wherein the interim estimate is based on the relationship:

$$\hat{\theta}_j \equiv E(u \mid \theta) = \frac{\sum_{k=1}^{q} X_k L_j(X_k) W(X_k)}{\sum_{k=1}^{q} L_j(X_k) W(X_k)}.$$

8. The method of claim 7 further comprising:
providing an item selection process for selecting the one or more items based upon the initial ability estimate from at least the first section.

9. The method of claim 7 wherein the computer implemented test battery comprises a computer adaptive test.

10. The method of claim 8 further comprising:
factoring into the item selection processes interrelatedness between the first test section and the subsequent test sections.

11. The method of claim 7 further comprising:
minimizing overexposure and over usage of selected test items from the plurality of test items by basing item selection in the subsequent test section on the ability estimate from the first section.

12. The method of claim 7 further comprising: minimizing the plurality of test items to a subset of test items based upon the initial ability estimate from at least the previous first section.

13. The method of claim 8 further comprising:
improving interim ability estimation accuracy and item selection efficiency by informing the item selection process with ability estimates from the first test section or a previous test section.

14. A method of item selection comprising;
providing a computer and computer implemented test battery comprising at least two or more test sections having a plurality of test items;
administering the first section of the at least two or more test sections to an examinee using the computer, wherein the computer receives an examinee's performance on a set of the plurality of test items for the first test section;
calculating an initial ML or an EAP ability estimate from the examinee's performance on the set of the plurality of test items in the first test section;
minimizing the plurality of test items to a subset of test items based upon the initial ability estimate from at least the previous first test section;
selecting a second item from the subset of test items for the subsequent test section; and
calculating an interim ability estimate, the interim ability estimate comprising either an ML ability estimate or an EAP estimate from the examinee's performance on the set of plurality of test items in the second section, wherein the interim estimate is based on the relationship:

$$\hat{\theta}_j \equiv E(u \mid \theta) = \frac{\sum_{k=1}^{q} X_k L_j(X_k) W(X_k)}{\sum_{k=1}^{q} L_j(X_k) W(X_k)}.$$

15. The method of claim 14 further comprising:
adapting the second test item selection to scores from the first test section.

16. The method of claim 14 further comprising:
calculating an initial theta for the subsequent test section based on the examinee's ability from the first test section, wherein the first test section is related to the subsequent test section.

17. The method of claim 14 further comprising:
selecting the second item from the subset of test items to include in the subsequent test section to the first test section of the at least two or more test sections based upon the ability estimates from at least the first test section.

18. The method of claim 14 further comprising;
factoring interrelatedness between the at least two or more test sections into the second test item selection.

19. The method of claim 14 further comprising:
minimizing overexposure and over usage of selected test items from the plurality of test items by basing the second item selection in the subsequent test section on an interim ability estimate arrived at from the initial ability estimate.

20. The method of claim 7 further comprising: improving the interim ability estimation accuracy an item selection efficiency by informing the second test item selection with an interim ability estimate resulting from the initial ability estimate informed by ability estimates obtained from the first test section or previous test sections.

* * * * *